United States Patent
Akhoundi et al.

(10) Patent No.: US 11,836,843 B2
(45) Date of Patent: *Dec. 5, 2023

(54) ENHANCED POSE GENERATION BASED ON CONDITIONAL MODELING OF INVERSE KINEMATICS

(71) Applicant: Electronic Arts Inc., Redwood City, CA (US)

(72) Inventors: Elaheh Akhoundi, Vancouver (CA); Fabio Zinno, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/646,563

(22) Filed: Dec. 30, 2021

(65) Prior Publication Data

US 2022/0198733 A1 Jun. 23, 2022

Related U.S. Application Data

(63) Continuation of application No. 16/863,886, filed on Apr. 30, 2020, now Pat. No. 11,217,003, which is a (Continued)

(51) Int. Cl.
*G06T 17/20* (2006.01)
*G06T 13/80* (2011.01)
*G06N 20/00* (2019.01)

(52) U.S. Cl.
CPC ............ *G06T 13/80* (2013.01); *G06N 20/00* (2019.01); *G06T 17/20* (2013.01); *G06T 2200/24* (2013.01)

(58) Field of Classification Search
None
See application file for complete search history.

(56) References Cited

U.S. PATENT DOCUMENTS 5,274,801 A  12/1993  Gordon
5,548,798 A   8/1996  King
(Continued)

FOREIGN PATENT DOCUMENTS

CN  102509272 A  6/2012
CN  103546736 A  1/2014
(Continued)

OTHER PUBLICATIONS

Anagnostopoulos et al., "Intelligent modification for the daltonization process", International Conference on Computer Vision Published in 2007 by Applied Computer Science Group of digitized paintings.
(Continued)

*Primary Examiner* — Nicholas R Wilson
(74) *Attorney, Agent, or Firm* — Knobbe, Martens, Olson & Bear, LLP

(57) ABSTRACT

Systems and methods are provided for enhanced pose generation based on conditional modeling of inverse kinematics. An example method includes accessing an autoencoder trained based on poses, with each pose being defined based on location information of joints, and the autoencoder being trained based on conditional information indicating positions of a subset of the joints. The autoencoder is trained to reconstruct, via a latent variable space, each pose based on the conditional information. Information specifying positions of the subset of the joints is obtained via an interactive user interface and the latent variable space is sampled. An output is generated for inclusion in the interactive user interface based on the sampling and the positions.

20 Claims, 15 Drawing Sheets

Related U.S. Application Data continuation of application No. 16/841,070, filed on Apr. 6, 2020, now Pat. No. 11,232,621.

(56) References Cited

U.S. PATENT DOCUMENTS

| | | | |
|---|---|---|---|
| 5,982,389 | A | 11/1999 | Guenter et al. |
| 5,999,195 | A | 12/1999 | Santangeli |
| 6,064,808 | A | 5/2000 | Kapur et al. |
| 6,088,040 | A | 7/2000 | Oda et al. |
| 6,253,193 | B1 | 6/2001 | Ginter et al. |
| 6,556,196 | B1 | 4/2003 | Blanz et al. |
| 6,961,060 | B1 | 11/2005 | Mochizuki et al. |
| 7,006,090 | B2 | 2/2006 | Mittring |
| 7,403,202 | B1 | 7/2008 | Nash |
| 7,415,152 | B2 | 8/2008 | Jiang et al. |
| 7,944,449 | B2 | 5/2011 | Petrovic et al. |
| 8,100,770 | B2 | 1/2012 | Yamazaki et al. |
| 8,142,282 | B2 | 3/2012 | Canessa et al. |
| 8,154,544 | B1 | 4/2012 | Cameron et al. |
| 8,207,971 | B1 | 6/2012 | Koperwas et al. |
| 8,267,764 | B1 | 9/2012 | Aoki et al. |
| 8,281,281 | B1 | 10/2012 | Smyrl et al. |
| 8,395,626 | B2 | 3/2013 | Millman |
| 8,398,476 | B1 | 3/2013 | Sidhu et al. |
| 8,406,528 | B1 | 3/2013 | Hatwich |
| 8,540,560 | B2 | 9/2013 | Crowley et al. |
| 8,599,206 | B2 | 12/2013 | Hodgins et al. |
| 8,624,904 | B1 | 1/2014 | Koperwas et al. |
| 8,648,863 | B1 | 2/2014 | Anderson et al. |
| 8,860,732 | B2 | 10/2014 | Popovic et al. |
| 8,914,251 | B2 | 12/2014 | Ohta |
| 9,067,097 | B2 | 6/2015 | Lane et al. |
| 9,117,134 | B1 | 8/2015 | Geiss et al. |
| 9,177,409 | B2 | 11/2015 | Rennuit et al. |
| 9,208,613 | B2 | 12/2015 | Mukai |
| 9,256,973 | B2 | 2/2016 | Koperwas et al. |
| 9,317,954 | B2 | 4/2016 | Li et al. |
| 9,483,860 | B2 | 11/2016 | Hwang et al. |
| 9,616,329 | B2 | 4/2017 | Szufnara et al. |
| 9,741,146 | B1 | 8/2017 | Nishimura |
| 9,811,716 | B2 | 11/2017 | Kim et al. |
| 9,826,898 | B1 | 11/2017 | Jin et al. |
| 9,827,496 | B1 | 11/2017 | Zinno |
| 9,858,700 | B2 | 1/2018 | Rose et al. |
| 9,928,663 | B2 | 3/2018 | Eisemann et al. |
| 9,947,123 | B1 | 4/2018 | Green |
| 9,984,658 | B2 | 5/2018 | Bonnier et al. |
| 9,987,749 | B2 | 6/2018 | Nagendran et al. |
| 9,990,754 | B1 | 6/2018 | Waterson et al. |
| 10,022,628 | B1 | 7/2018 | Matsumiya et al. |
| 10,096,133 | B1 | 10/2018 | Andreev |
| 10,118,097 | B2 | 11/2018 | Stevens |
| 10,163,001 | B2 | 12/2018 | Kim et al. |
| 10,198,845 | B1 | 2/2019 | Bhat et al. |
| 10,297,066 | B2 | 5/2019 | Brewster |
| 10,314,477 | B1 | 6/2019 | Goodsitt et al. |
| 10,388,053 | B1 | 8/2019 | Carter, Jr. et al. |
| 10,403,018 | B1 | 9/2019 | Worsham |
| 10,535,174 | B1 | 1/2020 | Rigiroli et al. |
| 10,726,611 | B1 | 7/2020 | Court |
| 10,733,765 | B2 | 8/2020 | Andreev |
| 10,755,466 | B2 | 8/2020 | Chamdani et al. |
| 10,792,566 | B1 | 10/2020 | Schmid |
| 10,810,780 | B2 | 10/2020 | Hutchinson et al. |
| 10,818,065 | B1 | 10/2020 | Saito et al. |
| 10,856,733 | B2 | 12/2020 | Anderson et al. |
| 10,860,838 | B1 | 12/2020 | Elahie et al. |
| 10,878,540 | B1 | 12/2020 | Stevens |
| 10,902,618 | B2 | 1/2021 | Payne et al. |
| 11,062,494 | B2 | 7/2021 | Orvalho et al. |
| 11,113,860 | B2 | 9/2021 | Rigiroli et al. |
| 11,217,003 | B2 | 1/2022 | Akhoundi et al. |
| 11,232,621 | B2 | 1/2022 | Akhoundi et al. |
| 11,295,479 | B2 | 4/2022 | Andreev |
| 11,504,625 | B2 | 11/2022 | Stevens |
| 2002/0054054 | A1 | 5/2002 | Sanbe |
| 2002/0089504 | A1 | 7/2002 | Merrick et al. |
| 2002/0180739 | A1 | 12/2002 | Reynolds et al. |
| 2003/0038818 | A1 | 2/2003 | Tidwell |
| 2004/0027352 | A1 | 2/2004 | Minakuchi |
| 2004/0227760 | A1 | 11/2004 | Anderson et al. |
| 2004/0227761 | A1 | 11/2004 | Anderson et al. |
| 2005/0237550 | A1 | 10/2005 | Hu |
| 2006/0036514 | A1 | 2/2006 | Steelberg et al. |
| 2006/0061574 | A1 | 3/2006 | Ng-Thow-Hing et al. |
| 2006/0149516 | A1 | 7/2006 | Bond et al. |
| 2006/0217945 | A1 | 9/2006 | Leprevost |
| 2006/0262113 | A1 | 11/2006 | Leprevost |
| 2006/0262114 | A1 | 11/2006 | Leprevost |
| 2007/0085851 | A1 | 4/2007 | Muller et al. |
| 2007/0097125 | A1 | 5/2007 | Xie et al. |
| 2008/0049015 | A1 | 2/2008 | Elmieh et al. |
| 2008/0111831 | A1 | 5/2008 | Son et al. |
| 2008/0152218 | A1 | 6/2008 | Okada |
| 2008/0268961 | A1 | 10/2008 | Brook |
| 2008/0316202 | A1 | 12/2008 | Zhou et al. |
| 2009/0066700 | A1 | 3/2009 | Harding et al. |
| 2009/0315839 | A1 | 12/2009 | Wilson et al. |
| 2010/0134501 | A1 | 6/2010 | Lowe et al. |
| 2010/0251185 | A1 | 9/2010 | Pattenden |
| 2010/0277497 | A1 | 11/2010 | Dong et al. |
| 2011/0012903 | A1 | 1/2011 | Girard |
| 2011/0074807 | A1 | 3/2011 | Inada et al. |
| 2011/0086702 | A1 | 4/2011 | Borst et al. |
| 2011/0119332 | A1 | 5/2011 | Marshall et al. |
| 2011/0128292 | A1 | 6/2011 | Ghyme et al. |
| 2011/0164831 | A1 | 7/2011 | Van Reeth et al. |
| 2011/0187731 | A1 | 8/2011 | Tsuchida |
| 2011/0269540 | A1 | 11/2011 | Gillo et al. |
| 2011/0292055 | A1 | 12/2011 | Hodgins et al. |
| 2012/0083330 | A1 | 4/2012 | Ocko |
| 2012/0115580 | A1 | 5/2012 | Hornik et al. |
| 2012/0220376 | A1 | 8/2012 | Takayama et al. |
| 2012/0244941 | A1 | 9/2012 | Ostergren et al. |
| 2012/0303343 | A1 | 11/2012 | Sugiyama et al. |
| 2012/0313931 | A1 | 12/2012 | Matsuike et al. |
| 2013/0050464 | A1 | 2/2013 | Kang |
| 2013/0063555 | A1 | 3/2013 | Matsumoto et al. |
| 2013/0120439 | A1 | 5/2013 | Harris et al. |
| 2013/0121618 | A1 | 5/2013 | Yadav |
| 2013/0222433 | A1 | 8/2013 | Chapman et al. |
| 2013/0235045 | A1 | 9/2013 | Corazza et al. |
| 2013/0263027 | A1 | 10/2013 | Petschnigg et al. |
| 2013/0311885 | A1 | 11/2013 | Wang et al. |
| 2014/0002463 | A1 | 1/2014 | Kautzman et al. |
| 2014/0066196 | A1 | 3/2014 | Crenshaw |
| 2014/0198106 | A1 | 7/2014 | Sumner et al. |
| 2014/0198107 | A1 | 7/2014 | Thomaszewski et al. |
| 2014/0267312 | A1 | 9/2014 | Powell |
| 2014/0327694 | A1 | 11/2014 | Cao et al. |
| 2014/0340644 | A1 | 11/2014 | Haine et al. |
| 2015/0113370 | A1 | 4/2015 | Flider |
| 2015/0126277 | A1 | 5/2015 | Aoyagi |
| 2015/0187113 | A1 | 7/2015 | Rubin et al. |
| 2015/0235351 | A1 | 8/2015 | Mirbach et al. |
| 2015/0243326 | A1 | 8/2015 | Pacurariu et al. |
| 2015/0381925 | A1 | 12/2015 | Varanasi et al. |
| 2016/0026926 | A1 | 1/2016 | Yeung et al. |
| 2016/0042548 | A1 | 2/2016 | Du et al. |
| 2016/0071470 | A1 | 3/2016 | Kim et al. |
| 2016/0078662 | A1 | 3/2016 | Herman et al. |
| 2016/0217723 | A1 | 7/2016 | Kim et al. |
| 2016/0307369 | A1 | 10/2016 | Freedman et al. |
| 2016/0314617 | A1 | 10/2016 | Forster et al. |
| 2016/0354693 | A1 | 12/2016 | Yan et al. |
| 2017/0132827 | A1 | 5/2017 | Tena et al. |
| 2017/0301310 | A1 | 10/2017 | Bonnier et al. |
| 2017/0301316 | A1 | 10/2017 | Farell |
| 2018/0024635 | A1 | 1/2018 | Kaifosh et al. |
| 2018/0043257 | A1 | 2/2018 | Stevens |
| 2018/0068178 | A1 | 3/2018 | Theobalt et al. |
| 2018/0122125 | A1 | 5/2018 | Brewster |
| 2018/0165864 | A1 | 6/2018 | Jin et al. |
| 2018/0211102 | A1 | 7/2018 | Alsmadi |

(56) References Cited

U.S. PATENT DOCUMENTS

| | | | |
|---|---|---|---|
| 2018/0239526 | A1 | 8/2018 | Varanasi et al. |
| 2019/0139264 | A1 | 5/2019 | Andreev |
| 2019/0325633 | A1 | 10/2019 | Miller, IV et al. |
| 2019/0392587 | A1 | 12/2019 | Nowozin et al. |
| 2020/0051304 | A1 | 2/2020 | Choi et al. |
| 2020/0151963 | A1 | 5/2020 | Lee et al. |
| 2020/0226811 | A1 | 7/2020 | Kim et al. |
| 2020/0258280 | A1 | 8/2020 | Park et al. |
| 2020/0294299 | A1 | 9/2020 | Rigiroli et al. |
| 2020/0302668 | A1 | 9/2020 | Guo et al. |
| 2020/0306640 | A1 | 10/2020 | Kolen et al. |
| 2020/0310541 | A1 | 10/2020 | Reisman et al. |
| 2020/0364303 | A1 | 11/2020 | Liu et al. |
| 2020/0394806 | A1 | 12/2020 | Payne et al. |
| 2021/0019916 | A1 | 1/2021 | Andreev |
| 2021/0074004 | A1 | 3/2021 | Wang et al. |
| 2021/0217184 | A1 | 7/2021 | Payne et al. |
| 2021/0252403 | A1 | 8/2021 | Stevens |
| 2021/0279956 | A1 | 9/2021 | Chandran et al. |
| 2021/0308580 | A1 | 10/2021 | Akhoundi et al. |
| 2021/0312688 | A1 | 10/2021 | Akhoundi et al. |
| 2021/0312689 | A1 | 10/2021 | Akhoundi et al. |
| 2021/0335039 | A1 | 10/2021 | Jones et al. |
| 2021/0390789 | A1 | 12/2021 | Liu et al. |
| 2022/0020195 | A1 | 1/2022 | Kuta et al. |
| 2022/0051003 | A1 | 2/2022 | Niinuma et al. |
| 2022/0138455 | A1 | 5/2022 | Nagano et al. |
| 2022/0222892 | A1 | 7/2022 | Luo et al. |
| 2022/0398795 | A1 | 12/2022 | Phan |
| 2022/0398796 | A1 | 12/2022 | Phan |
| 2022/0398797 | A1 | 12/2022 | Phan |

FOREIGN PATENT DOCUMENTS

| | | |
|---|---|---|
| CN | 105405380 A | 3/2016 |
| CN | 105825778 A | 8/2016 |
| JP | 2018-520820 A | 8/2018 |
| JP | 2019-162400 A | 9/2019 |

OTHER PUBLICATIONS

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Dudash, Bryan. "Skinned instancing." NVidia white paper(2007).

Fikkan, Eirik. Incremental loading of terrain textures. MS thesis. Institutt for datateknikk og informasjonsvitenskap, 2013.

Geijtenbeek, T. et al., "Interactive Character Animation using Simulated Physics", Games and Virtual Worlds, Utrecht University, The Netherlands, The Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

Habibie et al., "A Recurrent Variational Autoencoder for Human Motion Synthesis", 2017, in 12 pages.

Halder et al., "Image Color Transformation for Deuteranopia Patients using Daltonization", IOSR Journal of VLSI and Signal Processing (IOSR-JVSP) vol. 5, Issue 5, Ver. 1 (Sep.-Oct. 2015), pp. 15-20.

Han et al., "On-line Real-time Physics-based Predictive Motion Control with Balance Recovery," Eurographics, vol. 33(2), 2014, 10 pages.

Hernandez, Benjamin, et al. "Simulating and visualizing real-time crowds on GPU clusters." Computación y Sistemas 18.4 (2014): 651-664.

Hu G, Chan CH, Yan F, Christmas W, Kittier J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

Kim et al., "Long Range Attachments—A Method to Simulate Inextensible Clothing in Computer Games", Eurographics/ACM SIGGRAPH Symposium on Computer Animation (2012), 6 pgs.

Klein, Joseph. Rendering Textures Up Close in a 3D Environment Using Adaptive Micro-Texturing. Diss. Mills College, 2012.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs, obtained Mar. 20, 2015.

Levine, S. et al., "Continuous Character Control with Low-Dimensional Embeddings", Stanford University, University of Washington, 10 pgs, obtained Mar. 20, 2015.

Macklin et al., "Position Based Fluids", to appear in ACM TOG 32(4), 2013, 5 pgs.

Mcadams et al., "Efficient Elasticity for Character Skinning with Contact and Collisions", 2011, 11 pgs.

McDonnell, Rachel, et al. "Clone attack! perception of crowd variety." ACM Transactions on Graphics (TOG). vol. 27. No. 3. ACM, 2008.

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

Muller et al., "Real Time Dynamic Fracture with Columetric Approximate Convex Decompositions", ACM Transactions of Graphics, Jul. 2013, 11 pgs.

Muller et al., "Position Based Dymanics", VRIPHYS 2006, Oct. 21, 2014, Computer Graphics, Korea University, 23 pgs.

Musse, Soraia Raupp, and Daniel Thalmann. "Hierarchical model for real time simulation of virtual human crowds." IEEE Transactions on Visualization and Computer Graphics 7.2 (2001): 152-164.

Nguyen et al., "Adaptive Dynamics With Hybrid Response," 2012, 4 pages.

O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.

(56) References Cited

OTHER PUBLICATIONS

Orin et al., "Centroidal dynamics of a humanoid robot," Auton Robot, vol. 35, pp. 161-176, 2013, 18 pages.

Parker et al., "Real-Time Deformation and Fracture in a Game Environment", Eurographics/ACM SIGGRAPH Symposium on Computer Animation (2009), 12 pgs.

Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.

Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.

Ruiz, Sergio, et al. "Reducing memory requirements for diverse animated crowds." Proceedings of Motion on Games. ACM, 2013.

Rungjiratananon et al., "Elastic Rod Simulation by Chain Shape Matching with Twisting Effect" SIGGRAPH Asia 2010, Seoul, South Korea, Dec. 15-18, 2010, ISBN 978-1-4503-0439-9/10/0012, 2 pgs.

Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.

Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.

Stomakhin et al., "Energetically Consistent Invertible Elasticity", Eurographics/ACM SIGGRAPH Symposium on Computer Animation (2012), 9 pgs.

Thalmann, Daniel, and Soraia Raupp Musse. "Crowd rendering." Crowd Simulation. Springer London, 2013. 195-227.

Thalmann, Daniel, and Soraia Raupp Musse. "Modeling of Populations." Crowd Simulation. Springer London, 2013. 31-80.

Treuille, A. et al., "Near-optimal Character Animation with Continuous Control", University of Washington, 2007, 7 pgs.

Ulicny, Branislav, and Daniel Thalmann. "Crowd simulation for interactive virtual environments and VR training systems." Computer Animation and Simulation 2001 (2001): 163-170.

Vaillant et al., "Implicit Skinning: Real-Time Skin Deformation with Contact Modeling", (2013) ACM Transactions on Graphics, vol. 32 (n °4). pp. 1-11. ISSN 0730-0301, 12 pgs.

Vigueras, Guillermo, et al. "A distributed visualization system for crowd simulations." Integrated Computer-Aided Engineering 18.4 (2011): 349-363.

Wu et al., "Goal-Directed Stepping with Momentum Control," Eurographics/ ACM SIGGRAPH Symposium on Computer Animation, 2010, 6 pages.

Ali, Kamran, and Charles E. Hughes. "Facial expression recognition using disentangled adversarial learning." arXiv preprint arXiv: 1909.13135 (2019). (Year: 2019).

Qiao, Fengchun, et al. "Geometry-contrastive gan for facial expression transfer." arXiv preprint arXiv: 1802.01822 (2018). (Year: 2018).

Zhang, Jiangning, et al. "Freenet: Multi-identity face reenactment." Proceedings of the IEEE/CVF conference on computer vision and pattern recognition. 2020. (Year: 2020).

ENHANCED POSE GENERATION BASED ON CONDITIONAL MODELING OF INVERSE KINEMATICS

CROSS-REFERENCE TO RELATED APPLICATIONS

This application is a continuation of, and claims priority to, U.S. patent application Ser. No. 16/863,886 titled "ENHANCED POSE GENERATION BASED ON CONDITIONAL MODELING OF INVERSE KINEMATICS" and filed on Apr. 30, 2020 which is a continuation of, and claims priority to, U.S. patent application Ser. No. 16/841,070 titled "ENHANCED ANIMATION GENERATION BASED ON CONDITIONAL MODELING" and filed on Apr. 6, 2020, the disclosure of which is hereby incorporated herein by reference in its entirety.

TECHNICAL FIELD

The present disclosure relates to systems and techniques for pose generation. More specifically, this disclosure relates to machine learning techniques for pose generation.

BACKGROUND

Electronic games are increasingly becoming more realistic due to an increase in available processing resources. This increase in realism may allow for more realistic gameplay experiences. For example, elements that form an in-game world, such as characters, may be more realistically presented. In this example, the elements may be increasingly rendered at higher resolutions, with more detailed textures, with more detailed underlying meshes, and so on. While this added realism may be beneficial to an end-user of an electronic game, it may place a substantial burden on electronic game designers. As an example, electronic game designers may be required to create very rich, and detailed, models of characters. As another example, electronic game designers may be required to create fluid, lifelike, movements of the characters With respect to the example of movement, characters may be designed to realistically adjust their arms, legs, and so on, while traversing an in-game world. In this way, the characters may walk, run, jump, and so on, in a lifelike manner. To enable this realistic movement, electronic game designers may be required to spend substantial time fine-tuning movements of an underlying character model. Movement of a character model may be, at least in part, implemented based on movement of an underlying skeleton. For example, a skeleton may include a multitude of objects (e.g., joints) which may represent a portion of the character model. As an example, a first object may be a finger while a second object may correspond to a wrist. The skeleton may therefore represent an underlying form on which the character model is built. In this way, movement of the skeleton may cause a corresponding adjustment of the character model.

To create realistic movement, an electronic game designer may therefore adjust positions of the above-described objects included in the skeleton. For example, the electronic game designer may create realistic running movements via adjustment of specific objects which form a character model's legs. This hand-tuned technique to enable movement of a character results in substantial complexity and usage of time. Certain techniques to reduce a complexity associated with enabling movement of a character, such as via motion capture, may introduce their own complexities. For example, actors may need to be hired to perform different movements. As another example, complex motion capture stages may be required to monitor movement of the actors.

SUMMARY OF CERTAIN EMBODIMENTS

Particular embodiments of the subject matter described in this specification can be implemented so as to realize one or more of the following advantages. Utilizing the techniques described herein, realistic motion may be rapidly generated for arbitrary character models configured for use in electronic games. As will be described, machine learning techniques may be employed to learn representations of distinct human poses. For example, a pose may be defined, at least in part, based on positions of a multitude of joints on a human. Example joints may include a wrist, a shoulder, a knee, joints on a hip, and so on. As may be appreciated, these joints may indicate locations on a person which can rotate or otherwise adjust position. In this way, poses may be analyzed by the machine learning techniques. Advantageously, the machine learning techniques may, in some embodiments, be generative models. Thus, the generative models may allow for generation of realistic motion based on learned poses of humans.

At present, techniques to generate realistic motion for character models may rely upon designers adjusting character models to define different types of motion. For example, to define running, a designer may string together certain adjustments of joints on a skeleton of a character model. In this example, the designer may adjust the knees, cause a movement of the arms, and so on. While this may allow for motion to be generated, it may also involve a substantial burden on the designer.

A first example technique to, at least in part, automate motion, may include using software to automatically adjust a skeleton. For example, templates of running may be pre-defined. A designer may therefore select a running template which may cause adjustment of the joints on a skeleton. In this way, the designer may more rapidly generate motion for characters in an in-game world. However, this first example technique may lack the realism of real-world movement. For example, since different templates are being selected, the lifelike differences in movement between real-world persons is lost.

A second example technique may use motion capture techniques. For example, an actor may be placed in a motion capture studio. The actor may then perform different movements, and movement of different portions of the actor (e.g., joints) may be stored by a system. Thus, realistic movement for the specific actor may be translated onto a skeleton of an in-game character model. However, this second example technique may be similarly time-intensive. Additionally, due to the amount of time it takes to perform motion capture, and associated costs, it may typically be limited for a subset of the characters in an electronic game. Thus, motion of remaining characters may be less realistic. Furthermore, the motion capture techniques may limit an extent to which lifelike motion may be generated. For example, the actor may perform particular movements in the motion capture studio. While these movements may be imported onto a skeleton, other movement may have to be generated by designers. This may limit a flexibility of a range of realistic motion.

Furthermore, certain types of electronic games (e.g., sports games) may benefit from realistic movement of its characters. With respect to a wrestling or mixed martial arts electronic game, the playable characters in the game may correspond to real-life persons. Users of the electronic game may watch matches with the real-life persons, such that any deviations of their movement, mannerisms, and so on, may be apparent to the users.

As will be described below, machine learning techniques may be used to analyze poses of real-life persons. For example, and with respect to wrestling, poses of a real-life wrestler may be analyzed. In this example, a video clip of the wrestler may be obtained. Location information of features to be learned may be labeled. For example, positions of joints may be labeled for a pose depicted in a frame of the video clip. As another example, velocity information of the joints for the pose may be labeled. In this way, poses of the real-life wrestler may be analyzed. Since the wrestler may move about a ring in a highly stylized, and personal, style, the machine learning techniques may learn this style. In this way, certain wrestling moves may be realistically learned by the machine learning techniques.

It may be appreciated that the machine learning techniques may analyze a threshold number of features for each pose. For example, there may be 20, 30, and so on, joints for each pose. In this example, there may be features defining locations of each joint, velocity information for each joint, and so on. These features may therefore form a high-dimensional feature space. Advantageously, the machine learning techniques may employ dimensionality reduction techniques. Thus, information defined for each pose may be encoded into a lower-dimensional latent feature space (herein also referred to as a latent variable space). As an example, there may be a plurality of latent variables (e.g., 7, 10, 14, etc.) which learn to encode the above-described feature information. Each latent variable may therefore learn different information associated with the input features. For example, certain latent variables may learn complex movements of an upper portion of a person's body. As another example, certain latent variables may learn movement information for a hand.

As will be described, generative machine learning models may be used (e.g., autoencoders, variational autoencoders, and so on). Thus, new poses may be generated based on sampling the latent feature space. Advantageously, a designer may indicate a preferred initial pose for a character and a preferred ending pose. The generative machine learning models may then generate intermediate output poses which represent a realistic motion between these poses. For example, the initial pose may represent an in-game wrestler moving towards a combatant. In this example, an ending pose may represent the wrestler grabbing the combatant. Based on the learned latent feature space, a generative model may output poses which are determined to represent a transition between the initial pose and ending pose. These output poses may then be blended, or otherwise combined, to arrive at realistic resultant motion for the in-game wrestler.

Furthermore, certain generative machine learning models (e.g., conditional variational autoencoders) may be used to generate animation. As will be described, a machine learning model may be trained to reconstruct an input pose given one or more previous poses. For example, the input pose and previous poses may be obtained from an animation of a character or from video of a person. In this example, the previous poses may be used as a condition in a conditional variational autoencoder. Advantageously, once trained the machine learning model may be used to generate realistic animations via sampling of a latent feature space. As an example, a sequence of poses may be accessed. Based on the latent feature space, a new pose may be generated for the sequence. Via repeating this technique, for example using autoregressive methods, a multitude of new poses may be generated for an animation.

Similarly, in some embodiments a machine learning model may be trained to reconstruct an input pose given labeled positions of portions of a pose (e.g., joints). For example, the positions may be provided as conditions to a conditional variational autoencoder. In this way, the conditional variational autoencoder may learn to associate positions of joints with specific poses. Once trained, a pose may be modified via adjusting positions of joints. In this way, a user may cause realistic movement of joints from a starting pose.

In this way, the machine learning techniques described herein may learn representations of motion of persons. Based on these learned representations, realistic motion for arbitrary in-game characters may be rapidly generated. Since this motion is generated based on analyzing real-world persons, the motion may be substantially more realistic as compared to prior techniques. Additionally, the motion may be highly customizable. For example, motion of real-life persons may be separately analyzed to learn their particular movement styles.

The techniques described herein therefore improve upon the functioning of prior software-based techniques to generate movement of in-game character models. As described above, prior techniques relied upon by designers to adjust positions of joints on a skeleton underlying a character model. In contrast, the techniques described herein may allow for automated adjustment. Advantageously, the automated adjustment may be based on a latent feature space which encodes complex pose information. Using generative modeling techniques, complicated animations may be quickly generated.

The systems, methods, and devices of this disclosure each have several innovative aspects, no single one of which is solely responsible for the all of the desirable attributes disclosed herein.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

Like reference numbers and designations in the various drawings indicate like elements.

DETAILED DESCRIPTION

Overview

Figure 1A:
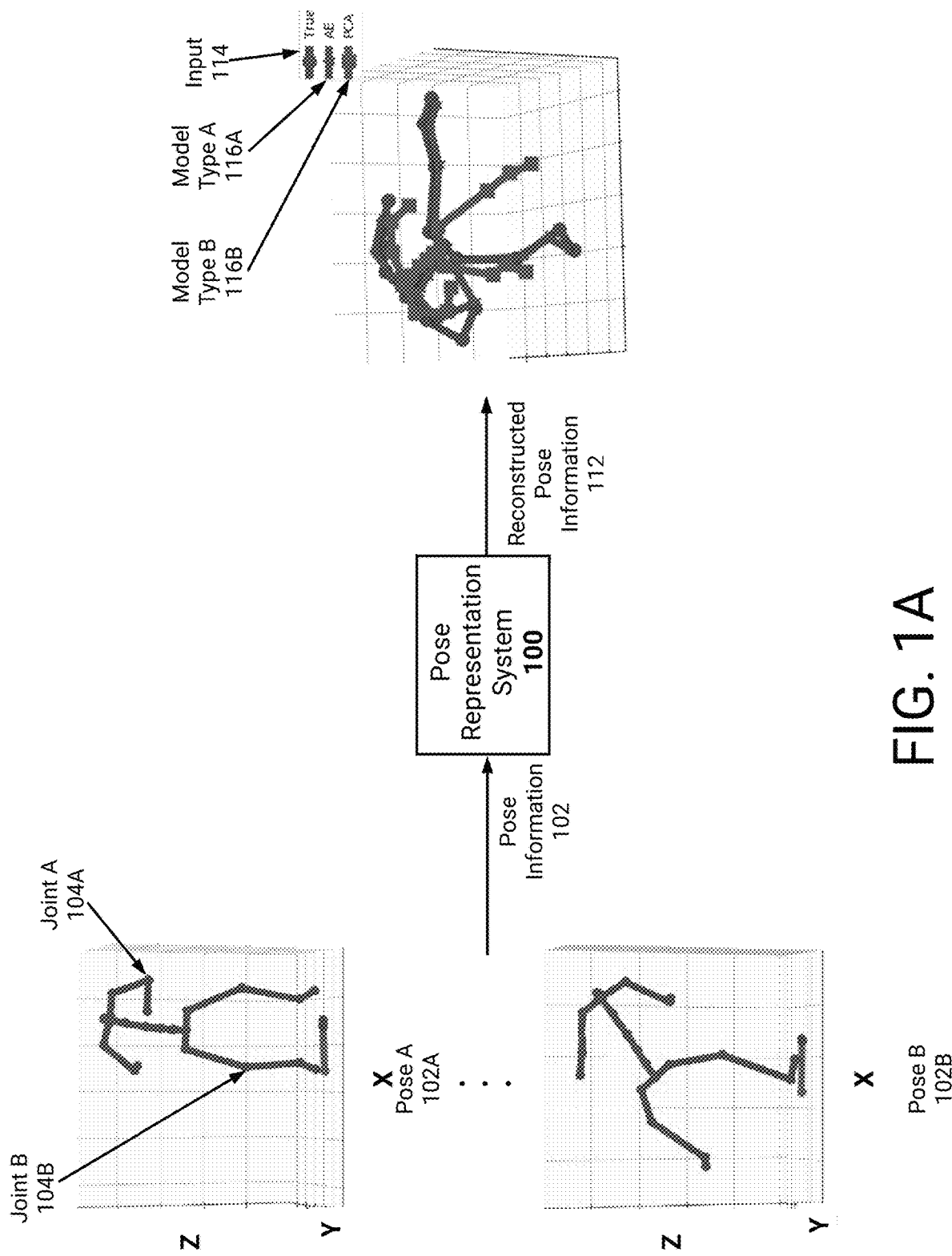
FIG. 1A illustrates a block diagram of an example pose representation system.

This specification describes, among other things, technical improvements with respect to generation of motion for characters configured for use in electronic games. As will be described a system described herein (e.g., the motion representation system 100) may generate realistic motion based on analyzing pose information of real-world persons. Advantageously, the system may allow for substantially automated pose generation and animation blending, motion generation, inverse kinematics, and so on. While electronic games are described, it may be appreciated that the techniques described herein may be applied generally to movement of character models. For example, animated content (e.g., TV shows, movies) may employ the techniques described herein.

Motion for an in-game character may be defined, at least in part, based on distinct poses of the in-game character. The distinct poses, for example, may be blended together to generate the motion. As an example, each pose may represent a discrete sample of the motion to be performed by the in-game character. Thus, if motion is to depict running, each pose may represent a snapshot of the running. The system may advantageously learn a latent feature space which encodes observable features defining these poses (e.g., positions of joints). As an example, the system may obtain a multitude of poses of real-life persons. For example, there may be thousands, hundreds of thousands, and so on, obtained poses. These poses may, in some embodiments, be obtained from video of the real-life persons. Thus, certain poses may represent discrete snapshots of a real-life person during a particular movement.

Each of the above-described poses may be provided as an input to the system. For example, observable features of the pose may be provided as an input. Example observable features may include positions of locations on the real-life person (e.g., three-dimensional coordinates). These positions are referred to herein as joints and may represent portions of the person which can rotate (e.g., knees, wrists, neck or portions thereof, and so on). Additional observable features may include velocity information for the joints. For example, a movement speed of portions the person may be determined.

The system may use machine learning techniques, an autoencoder, to reduce a dimensionality associated with the input features. In some embodiments, principle component analysis may be used as a dimensionality reduction technique. With respect to an autoencoder, the system may learn a latent feature space of a lower-dimension than the input features. The latent feature space may comprise a multitude of latent variables, such as 7, 9, 12, and so on. In some embodiments, a variational autoencoder may be used. Thus, the latent feature space may be (substantially) continuous and each latent variable may be defined, at least in part, as a distribution (e.g., a Gaussian). In this way, the input features defining a pose may be encoded in the latent feature space.

With respect to an autoencoder, an encoder may learn to map input features of poses to the latent feature space. A decoder may then learn to map the latent feature space to an output defining features of poses. Thus, the autoencoder may be trained to generate an output pose which reproduces an input pose. The learned latent feature space may represent a bottleneck, which causes each latent variable in the latent feature space to encode complex information associated with poses. In this way, the autoencoder may learn a latent feature space representing human poses.

It may be appreciated that this learned latent feature space may be used to generate poses. For example, the latent feature space for a variational autoencoder may be continuous. In this example, the latent variables may be defined as respective distributions with associated mean and variance. To generate a pose, the system may sample these latent variables. For example, the system may select values for these latent variables. This sample may then be provided to the decoder to generate an output pose, for example as a vector associated with the latent feature space. In this way, and as illustrated in FIG. 1C, new poses may be generated by the system.

Advantageously, realistic motion may be generated by the system using the above-described generative modeling technique. It may be appreciated that the learned latent feature space may encode input features according to different loss terms used during training of a variational autoencoder. A first loss term may cause an output of the autoencoder to be similar to that of the input. A second loss term, such as a Kullback-Leibler divergence (KL divergence) term, may represent a difference between two distributions. For example, a first distribution may be associated with a learned latent variable (e.g., a posterior distribution $q(z|x)$, where x is an input). As another example, a second distribution may represent a prior distribution which may have mean of '0' and standard deviation of '1'. These two loss terms may allow for the learned feature space to encode meaningful pose information, such that generated poses may be realistic in output.

As will be described, realistic motion may be generated via autoregressive techniques. For example, a particular autoencoder (e.g., a conditional variational autoencoder) may be trained using an input pose and one or more prior poses as conditions. Thus, the particular autoencoder may be trained to reconstruct the input pose given the one or more prior poses. Advantageously, once trained the particular autoencoder may be used to generate a sequence of poses for blending together as animation. As an example, a sequence of poses may be used to sample a latent feature space generated based on the particular autoencoder. Via sampling the latent feature space, a new pose may be generated. This new pose may be generated such that it is a realistic next pose in the sequence of poses.

In some embodiments, the techniques described herein may be performed during in-game gameplay of an electronic game. For example, an electronic game may generate information indicating one or more poses which an in-game character is to perform. In this example, the poses may reflect running, performing an action (e.g., a wrestling action, a sports action), and so on. The electronic game may thus generate additional poses in a realistic sequence of poses. These additional poses may be followed by the in-game character, for example via adjusting joints of a skeleton of the in-game character. In this way, the in-game character may realistically perform running or the action described above.

Similarly, the particular autoencoder described above may use information associated with joints as a condition. For example, end effectors may be identified (e.g., hands, feet, and so on). In this example, the particular autoencoder may be trained to reconstruct an input pose based on these effectors. As an example, positions of the hands, feet, and so on, may be labeled. As another example, velocity information may be labeled. In this way, once trained a pose may be modified via modifying positions of the joints. For example, a pose in which a character has its arms positioned downwards may be modified to have its arms moved upwards. Advantageously, this modification may be realistically performed via the trained autoencoder.

The above-described modification may, in some embodiments, be used during in-game gameplay of an electronic game. For example, an in-game character may be crouched down holding an item. In this example, the game may modify the pose of the in-game character to have the character's arms move outwards while holding the item. To effectuate this modification, the particular autoencoder may sample a generated latent feature space. A resulting pose may then be generated by the particular autoencoder based on the samples and given the updated position of the arms as conditional information. The resulting pose may be utilized to update a skeleton of the in-game character.

Example Block Diagrams—Latent Feature Space

FIG. 1A illustrates a block diagram of an example pose representation system 100. In the illustrated embodiment, the pose representation system 100 is analyzing pose information 102 and generating reconstructed pose information 112. The pose representation system 100 may, in some embodiments, be a system of one or more computers, one or more virtual machines executing on a system of one or more computers, and so on. In some embodiments, the pose representation system 100 may be implemented as a module, or software (e.g., an application), which may execute on a user device (e.g., a laptop, tablet, console gaming system, and so on).

Two poses 102A-102B are illustrated as being included in the pose information 102. While two poses are illustrated, it may be appreciated that thousands, hundreds of thousands, millions, and so on, poses may be input to the pose representation system 100. The pose information 102 may be obtained via analyzing images and/or video of real-life persons. For example, video of wrestlers may be analyzed. In this example, each frame of the video may depict one or more wrestlers. As another example, motion capture information may be obtained. In this example, real-life wrestlers may be placed into motion capture studios.

Each image and/or frame of video may be analyzed to identify features to be input into the pose representation system 100. For example, the features may include locations of joints. Example joints may include a wrist, joints on a finger, an elbow, a knee, one or more joints on a hip, and so on. Thus, a joint may represent a portion of real-life person which is capable of being rotated or otherwise controlled by the real-life person. The locations of the joints may be defined, in some embodiments, as three-dimensional coordinates. For example, a coordinate reference frame may be defined. Each image and/or frame of video may be analyzed to map joints of a real-life person onto the coordinate reference frame. As an example, movement of a wrestler in a video clip may be analyzed to determine relative movement of each of the joints. This relative movement may be translated to the coordinate reference frame for use by the pose representation system 100. In some embodiments, deep learning techniques (e.g., convolutional neural networks) may be utilized to extract locations of the joints. For example, a deep learning model may be trained to identify specific joints depicted in an image or video frame.

Similarly, motion capture information may be analyzed to identify features to be input into the pose representation system 100. Motion capture information may, in some embodiments, allow for rapid importation of locations of joints on a real-life person. For example, the motion capture information may indicate locations of the person's joints at discrete times. Each discrete time may be defined as a particular pose of the person. Thus, the location of the joints may be identified for each pose.

In addition to locations of joints, in some embodiments the pose representation system 100 may obtain additional information as inputs. For example, positions of the joints, orientations of the joints, root linear and angular velocity information, and so on, may be used. In this example, velocity information may be associated with a speed associated with each joint. This speed may, as an example, be extracted from a speed of movement of a portion of a real-life person connected to a joint. As an example with respect to an elbow, a speed may be identified based on a speed of movement of the forearm. Velocity may be extracted from video based on measures of movement of each joint. Thus, velocity information may represent a substantially instantaneous velocity of movement of each joint. Velocity may also be obtained based on motion capture of real-life persons.

In FIG. 1A, pose A 102A is graphically depicted as representing a particular pose. For this particular pose, joint A 104A corresponds to an elbow and joint B 104B corresponds to a knee. Location information for these joints 104A-104B may be provided as an input to the pose representation system 100. For example, the location information may be combined into a data structure, such as a vector or matrix, and define three-dimensional locations of the joints. Similarly, velocity information for the pose A 102A may be concatenated, or otherwise combined, with the location information. Pose B 102B is further illustrated in FIG. 1A. This pose 102B illustrates a different orientation of the joints as compared to the pose A 102A.

In some embodiments, a multitude of poses (e.g., hundreds, thousands, and so on) may be provided to the pose representation system 100. As will be described below, the pose representation system 100 may train a machine learning model (e.g., an autoencoder) based on the multitude of poses. Thus, the multitude of poses may represent a batch of poses. In some embodiments, there may be a multitude of batches. For each batch, the pose representation system 100 may update the machine learning model. With respect to an autoencoder, the pose representation system 100 may learn to reproduce a same output pose as provided in an input to the system 100.

For example, subsequent to training, reconstructed pose information 112 may be generated by the pose representation system 100. An example input pose 114 is illustrated in FIG. 1A, along with reconstructed poses generated by two models 116A-116B. As described herein, the models may employ dimensionality reduction techniques to learn a latent feature space. Model Type A 116A may, as an example, be an autoencoder. Model Type B 116B may, as an example, be a model using principle component analysis. Thus, the pose representation system 100 may learn to reconstruct poses based on the latent feature space.

Figure 1B:
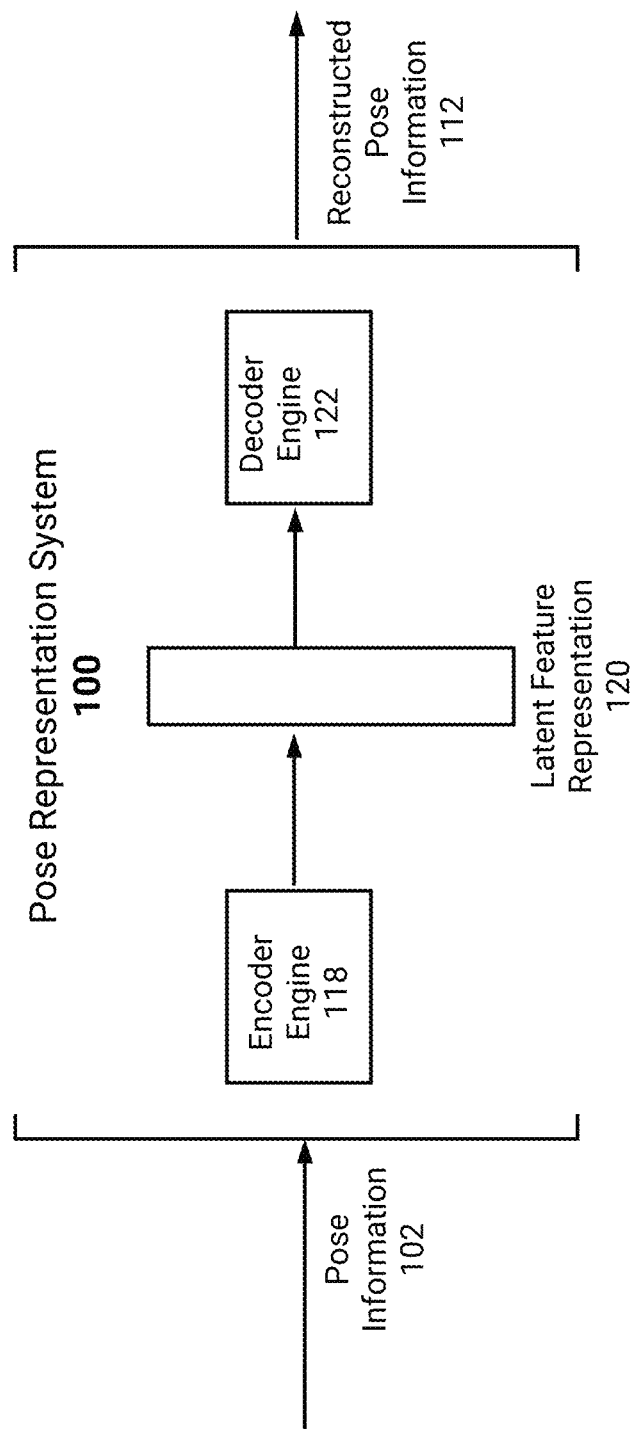
FIG. 1B illustrates another block diagram of the example pose representation system.
Figure 1C:
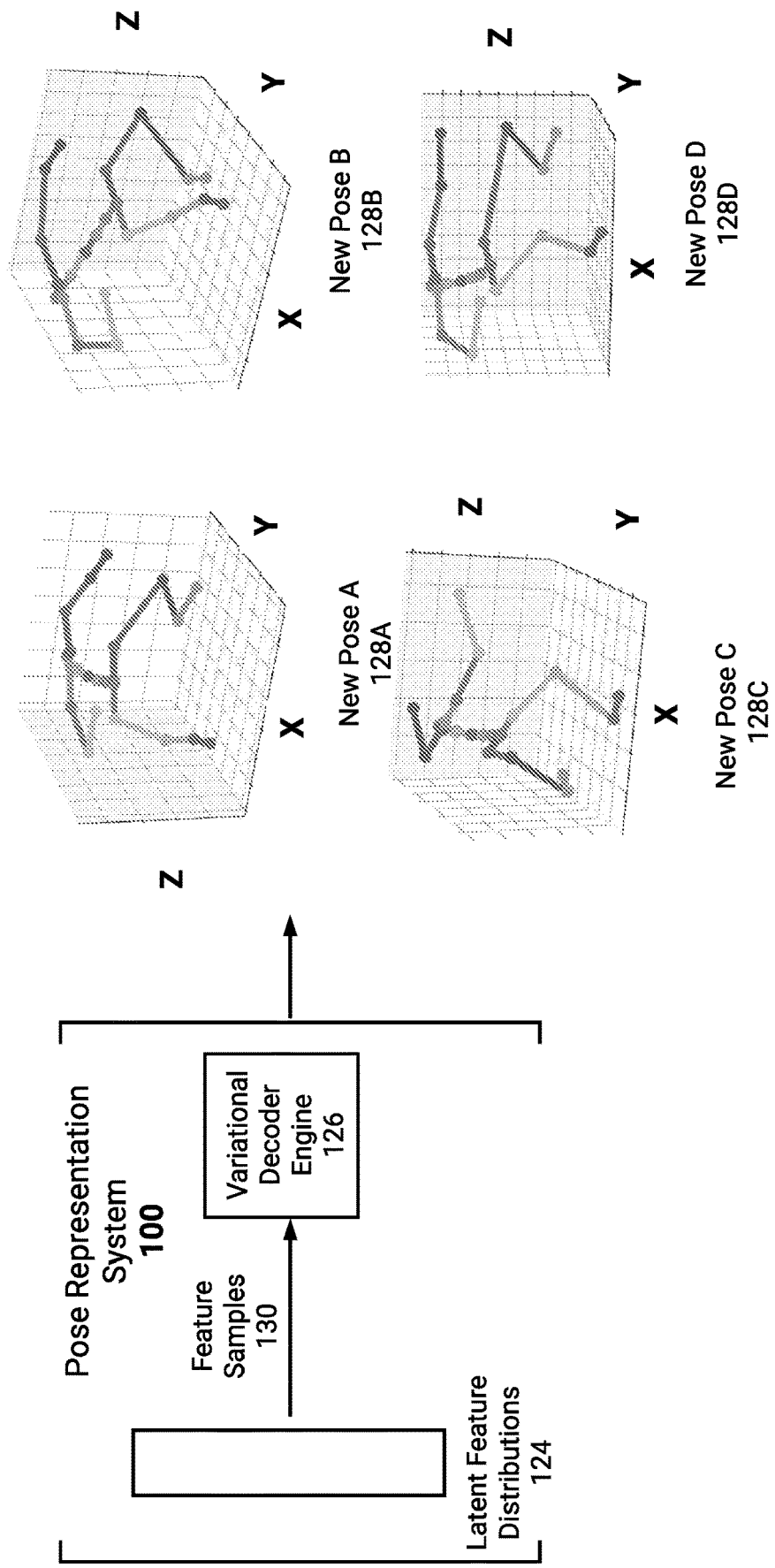
FIG. 1C illustrates the example pose representation system generating new poses.

FIG. 1B illustrates another block diagram of the example pose representation system 100. In this example, the pose representation system 100 may implement an autoencoder. As illustrated, the autoencoder may include an encoder engine 118 usable to map input pose information 102 to a latent feature representation 120. The autoencoder may also include a decoder engine 122 to generate reconstructed pose information based on the latent feature representation 120.

As may be appreciated, an autoencoder is an unsupervised machine learning technique capable of learning efficient representations of input data. The encoder engine 118 and decoder engine 122 may represent neural networks, such as dense (e.g., fully connected) neural networks. As described above, the output of the encoder engine 118 may be provided into the decoder engine 122 through a shared layer of variables (e.g., hidden variables) which may be referred to as the latent feature representation of the input. As may be appreciated, the output of the encoder engine 118 may be obtained via a forward pass of input pose information 102 through layers forming the encoder engine 118. Advantageously, the latent feature representation 120 may be of lower-dimensions than the input pose information 102. Thus, the latent feature representation 120 may be an encoding of input pose information 102 with respect to a latent feature space. The encoding may comprise values for a multitude of latent variables.

In some embodiments, the autoencoder may represent a variational autoencoder. Thus, the latent feature space may be (substantially) continuous and the latent variables may be distributions (e.g., Gaussian distributions). A variational autoencoder may be a generative model which may therefore learn a probabilistic model for the input pose information 102. In this way, once the pose representation system 100 learns the distributions of the latent variables, the system 100 may generate new poses based on sampling the distributions.

FIG. 1C illustrates the example pose representation system 100 generating new poses 128A-128D. As described above, in some embodiments a variational autoencoder may be used. For example, input pose information may be used to train the variational autoencoder. A resulting latent feature space may be generated which is based on distributions of latent variables. For example, the variational autoencoder may learn latent feature distributions 124 as illustrated in FIG. 1C.

The new poses 128A-128D may be generated, as described above, based on samples 130 of the latent feature distributions. For example, one or more values of each latent feature distribution may be obtained. In some embodiments, the pose representation system 100 may respond to user input via an interactive user interface. The user input may indicate the samples 130 to be obtained. These samples may be provided to a variational decoder engine 126 for use in generating new poses.

Advantageously, one or more of these new poses 128A-128D may be newly generated as compared to input pose information. For example, the latent feature distributions 124 may be generated based on the input pose information. Once generated, for example when the variational autoencoder is trained, the resulting latent feature distributions 124 may be substantially continuous. Thus, samples of the distributions 124 may be obtained which do not precisely correspond with mappings of input pose information onto the latent feature space. In this way, the variational decoder engine 126 may generate new poses based on the samples. These poses may advantageously represent realistic poses of persons.

As will be described, generating poses may be utilized to perform blending between two poses. For example, a user may specify a first pose and a second pose. The pose representation system 100 may then generate intermediate poses which allow for a substantially seamless transition between the first pose and the second pose.

While variational autoencoders are described above, it may be appreciated that other generative models may be used and fall within the scope of the disclosure herein. For example, LSTM-based autoencoders may be used. As another example, generative adversarial networks (GANs) may, in some embodiments, be utilized.

Example Flowchart/Block Diagrams—Generating Output Pose(s)

Blending between poses is of great importance to electronic game designers. For example, blending may allow for in-game character animation between distinct poses. As will be described, the techniques described herein may allow for rapid blending between two poses (e.g., an initial pose and an end pose). For example, intermediate output poses may be generated by the system 100 based on the two poses.

Figure 2:
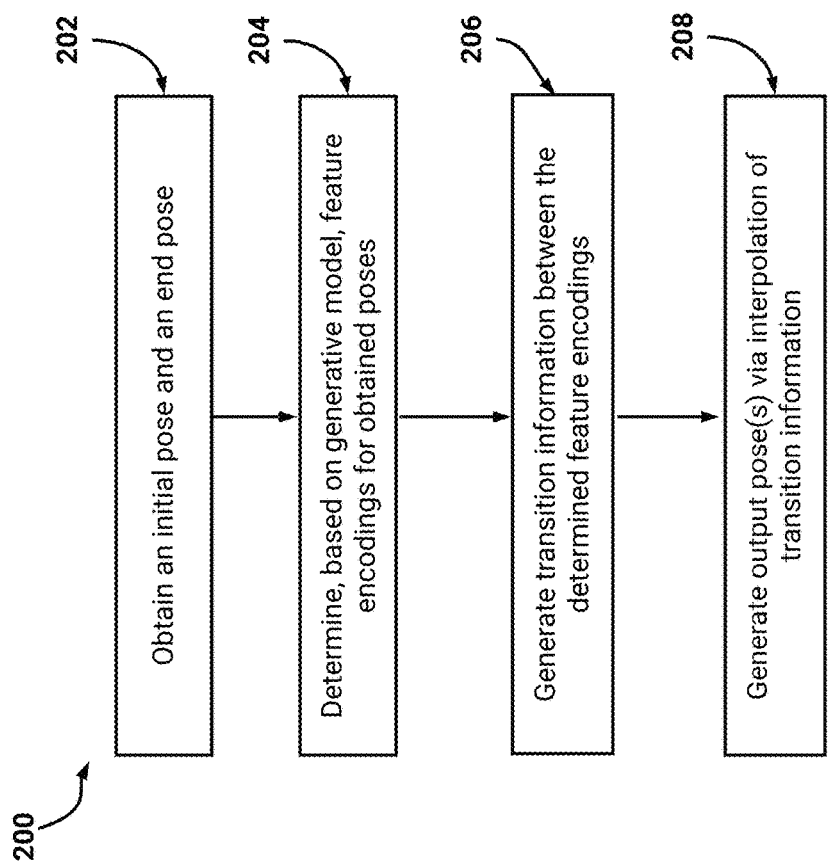
FIG. 2 is a flowchart of an example process for generating output poses based on a latent feature space.

FIG. 2 is a flowchart of an example process 200 for generating output poses based on a latent feature space. For convenience, the process 200 will be described as being performed by a system of one or more computers (e.g., the pose representation system 100).

At block 202, the system obtains an initial pose and an end pose. A user, such as a designer, may define the initial pose and the end pose via an interactive user interface. For example, the user interface may allow for a specification of each pose via adjustment of joints on an underlying skeleton. The user may prefer that the initial pose and end pose be blended together, such that a smooth transition between the poses be obtained.

At block 204, the system determines feature encodings for the poses based on a generative model. As described in FIGS. 1A-1C, a generative model (e.g., an autoencoder, a variational autoencoder) may be used to learn a latent feature space for input poses. Thus, the system may provide the initial pose to an encoder of the generative model. This encoder may map the initial pose to the latent feature space. With respect to a variational autoencoder, the initial pose may be mapped to values of distributions of latent variables forming the latent feature space. Thus, the system may determine feature encodings for the initial pose and the end pose. The feature encodings may represent locations in the latent feature space (e.g., values for the latent variables).

In some embodiments, the system may receive information identifying a particular real-world person from which the system is to generate encodings. For example, there may be a multitude of latent feature spaces corresponding to respective real-world persons. In this example, each latent feature space may be generated based on pose information for a specific real-world person. As another example, a conditional variational autoencoder may be used. In this example, the autoencoder may be trained with names of real-world persons as a condition (e.g., as a label). In some embodiments, the user may specify more than one real-world person and the resulting feature encodings may be based on these real-world persons.

At block 206, the system generates transition information between the feature encodings. The system may determine a line which connects the locations in the latent feature space corresponding to the feature encodings. Thus, in some embodiments the transition information may define the line passing through the feature encodings in the latent feature space.

At block 208, the system generates output poses via interpolation of the transition information. The system may sample points along the line, with each point being a feature encoding in the latent feature space. For each sample point, the associated feature encoding may be provided to a decoder. Since the decoder performs a nonlinear transformation of the feature encoding, such as via a forward pass of a neural network, the line in the latent feature space may represent meaningful transformation in the observed space (e.g., the output poses). In this way, the system may generate output poses based on the line.

In some embodiments, the system may sample a threshold number of points based on a length associated with the line. For example, longer lines may result in a greater number of output poses. In some embodiments, the system may sample in discrete steps each with a same measure of length apart from each other.

In some embodiments, the generated output poses may be provided to the user described above. For example, generated output poses may be represented as locations of joints of a skeleton. In this example, a data structure (e.g., a JavaScript Object Notation structure) may be used to store the locations for each generated pose. As another example, the generated output poses may be provided to the user in the interactive user interface. For example, graphical representations of the skeleton adjusted according to the poses, or a character model adjusted according to the poses, may be presented in the user interface.

The output poses may be blended together by the system, or an outside system. For example, the initial pose may be used as a key-frame. In this example, the generated output poses may follow the initial pose. With respect to the poses defining locations of joints, the system may adjust the joints from an initial pose to a first generated output pose. Similarly, the system may adjust the joints from the first generated output pose to a second generated output pose. Thus, the skeleton of an in-game character may be adjusted. The mesh, textures, and so on, which overlay the skeleton may be similarly adjusted. Thus, resulting movement of the in-game character may be generated.

Figure 3A:
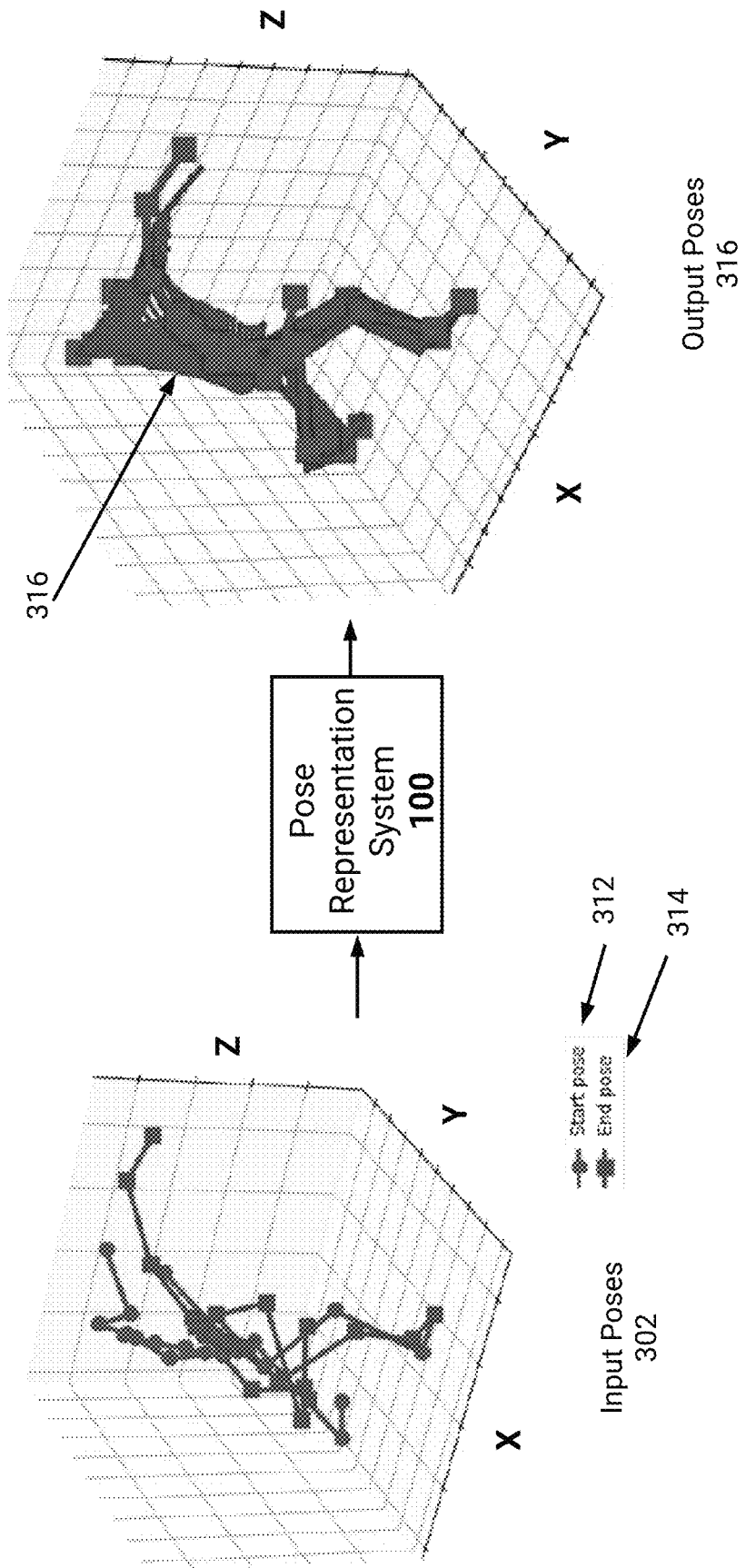
FIG. 3A illustrates the pose representation system generating output pose(s) based on an initial pose and an end pose.

FIG. 3A illustrates the pose representation system 100 generating output pose(s) 302 based on an initial pose 312 and an end pose 314. A graphical representation of the initial pose 312 and end pose 314 are included in the illustrated example. As described in FIG. 2, the pose representation system 100 may generate feature encodings for these poses 312-314. Transition information, such as a line, may be generated between the feature encodings. Output poses may then be generated based on sampling points along the line.

Example output poses 316 are illustrated in FIG. 3A. These output poses 316 are similarly graphically represented and indicate transitions from the initial pose 312 to the end pose 314. In some embodiments, the graphical representations illustrated in FIG. 3A may be presented to a user. For example, a user may provide information identifying the poses 312-314 via an interactive user interface as described in FIG. 2. In response, the system 100 may generate the output poses 316 for presentation in the interactive user interface.

Figure 3B:
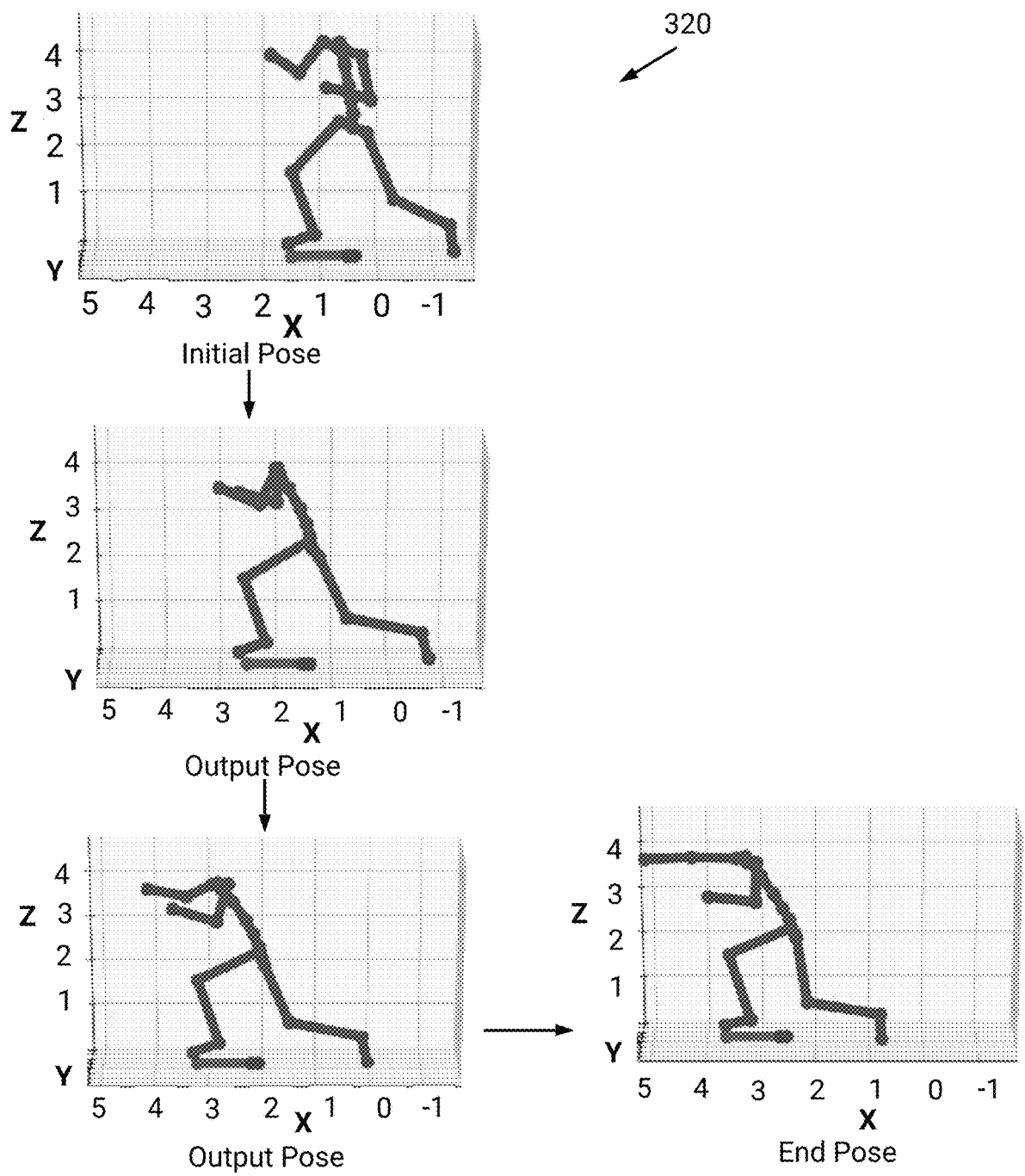
FIG. 3B illustrates example output poses generated by the example pose representation system.

FIG. 3B illustrates example output poses 320 generated by the example pose representation system 100. The example output poses depicted in FIG. 3B may be understood to represent a subset of the output poses which the system 100 may generate based on an initial pose and an end pose. For example, the system 100 may generate a multitude of output poses based on a certain distance metric along a line in the feature space connecting the initial pose and end pose.

Figure 3C:
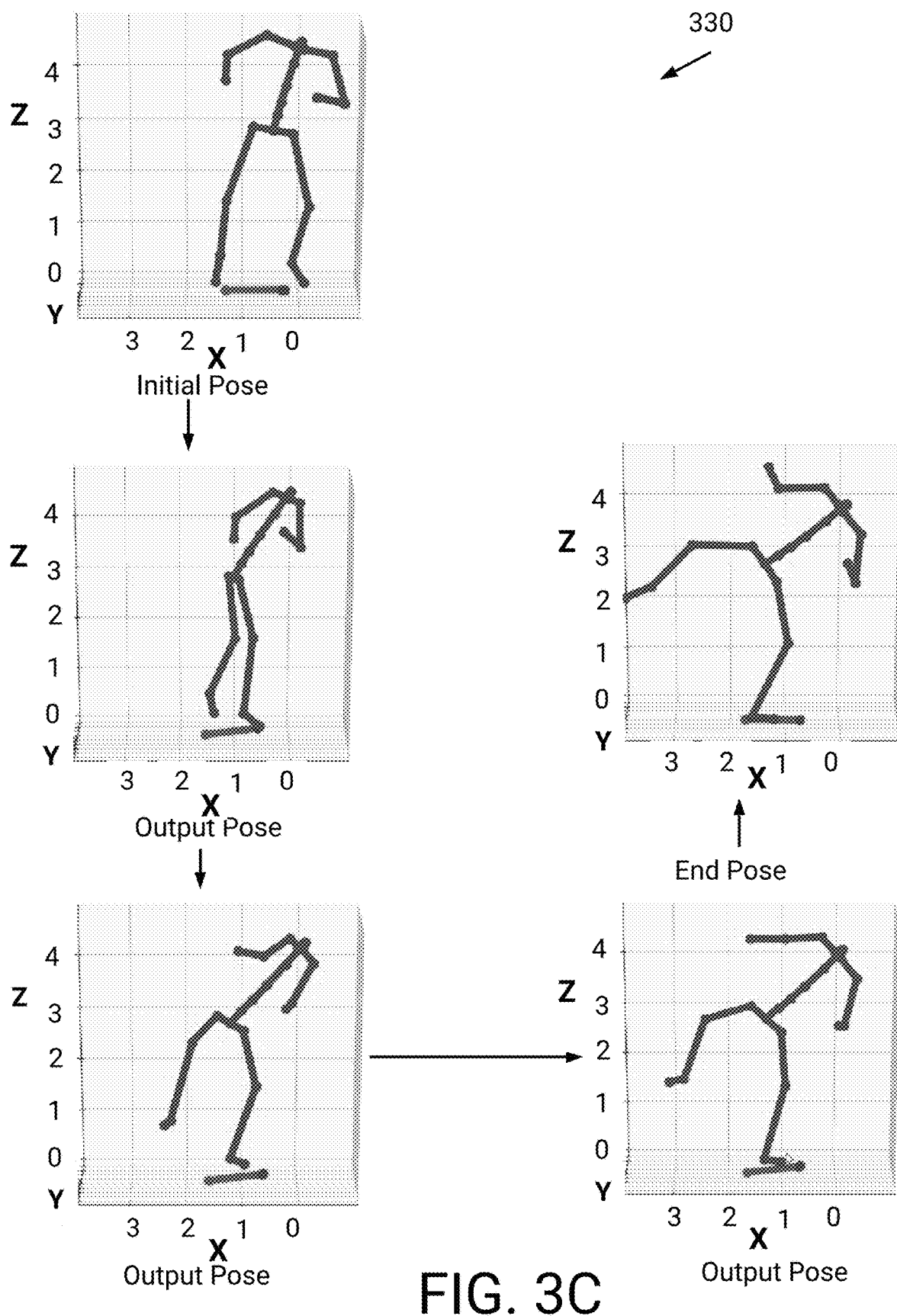
FIG. 3C illustrates additional example output poses generated by the example pose representation system.

FIG. 3C illustrates additional example output poses generated by the example pose representation system. The example output poses depicted in FIG. 3C may be understood to represent a subset of the output poses which the system 100 may generate based on an initial pose and an end pose. For example, the system 100 may generate a multitude of output poses based on a certain distance metric along a line in the feature space connecting the initial pose and end pose.

Example Block Diagrams—Conditional Variational Autoencoder

Figure 4:
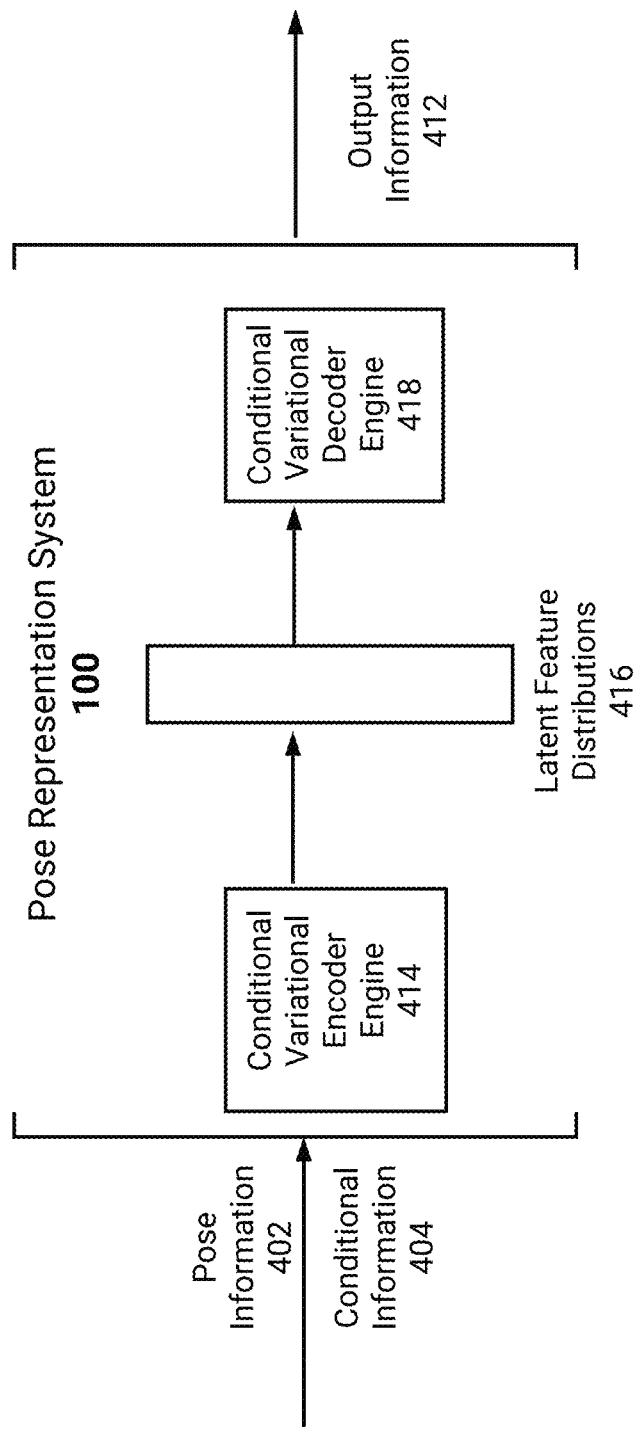
FIG. 4 illustrates the pose representation system implementing a conditional variational autoencoder.

FIG. 4 illustrates the pose representation system 100 implementing a conditional variational autoencoder. In some embodiments, the pose representation system 100 may implement a variational autoencoder which may be conditioned on different information 404. For example, the conditional information 404 may, in some embodiments, represent labels associated with the pose information. Example conditional information 404 is described in more detail below, with respect to FIGS. 6A-7C. Similar to the description above, the pose representation system 100 may generate output information 412 which may reflect one or more output poses.

Example conditional information 404 may include prior poses of an input pose which may be used by the system 100 to reconstruct the input pose during training. For example, the pose information 402 may reflect the input pose and the conditional information 404 may reflect poses prior to the input pose in a sequence of poses. In this example, the sequence of poses may be obtained from an animation of a character or from video of a real-life person. Each pose in the sequence of poses may therefore represent a discrete pose assumed by the character or person during a time period.

Example conditional information 404 may include label information associated with portions of a pose. Example label information may reflect positions of specific joints, end-effectors, and so on. As an example, position information for one or more of the hands, feet, neck, and so on, may be used as conditional information 404. Thus, pose information 402 associated with an input pose may be provided to the system 100. The associated conditional information 404 may therefore indicate position information for the input pose.

In some embodiments, example conditional information 404 may include prior poses of a particular pose, along with label information associated with portions of the particular pose. The pose representation system 100 may therefore combine the above-described conditional information 404. As will be described, the pose representation system 100 may learn to generate a pose which allows for a next pose in a sequence, along with adjustment of portions of the pose. For example, the system 100 may generate a new pose which comports with a sequence of poses. Advantageously, the system 100 may allow a user to specify positions of joints, such that the new pose may comport with the positions of joints.

The conditional information 404 may be concatenated, or otherwise combined with, the pose information 402. In this way, the information 402-404 may be provided as an input to a conditional variational encoder engine 414. In some embodiments, the conditional information 404 may be similarly concatenated with information provided from the feature space 416 to a conditional variational decoder engine 418.

As will be described below, once trained the pose representation system 100 may be used to generate new poses using the conditional information 404. With respect to the conditional information 404 being prior poses, the decoder 418 may be used to autoregressively predict one or more new poses from one or more prior poses. For example, a sequence of poses may be used to generate a next pose which would be included in the sequence of poses. This next pose may then be used as feedback to generate another pose. With respect to the conditional information 404 being positions, the decoder 418 may be used to generate a pose which is updated based on position information. For example, position information may be used to generate a realistic new pose which corresponds with specified position information. In this example, a user interface may be used by a user to specify positions of joints, end-effectors, and so on. The decoder 418 may use samples of the latent feature distributions 416, along with the conditional information, to generate a pose associated with the position information.

As described above, the above-described conditional information may be combined. For example, a conditional variational autoencoder may be trained to reconstruct a particular pose based on prior pose information and position information of the particular pose. Thus, the system 100 may be used to generate an animation in which a multitude of new output poses are generated. As an example, the animation may reflect a character walking down a street with its arms down. Once generated, the system 100 may be used to update the animation to generate the character holding its arms up. In this example, the system 100 may receive updated position information and generate output poses based on the updated position information.

Figure 5:
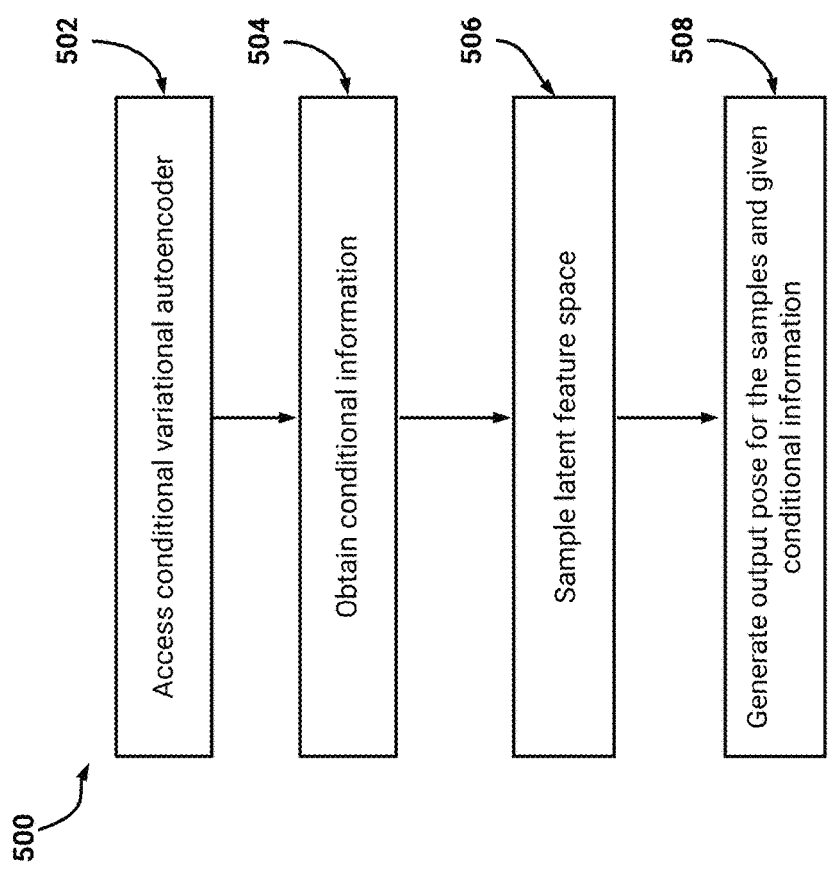
FIG. 5 is a flowchart of an example process for generating output pose(s) based on a conditional variation autoencoder.

FIG. 5 is a flowchart of an example process 500 for generating output pose(s) based on a conditional variational autoencoder. For convenience, the process 500 will be described as being performed by a system of one or more computers (e.g., the pose representation system 100).

At block 502, the system accesses a trained conditional variational autoencoder. As described above, with respect to FIG. 4, the system may train a conditional variational autoencoder to reconstruct an input pose conditioned on certain conditional information. Example conditional information may include one or more poses which were prior to the input pose in a sequence of poses. Example conditional information may also include position information associated with certain joints, end-effectors, and/or portions of a skeleton.

Figure 7A:
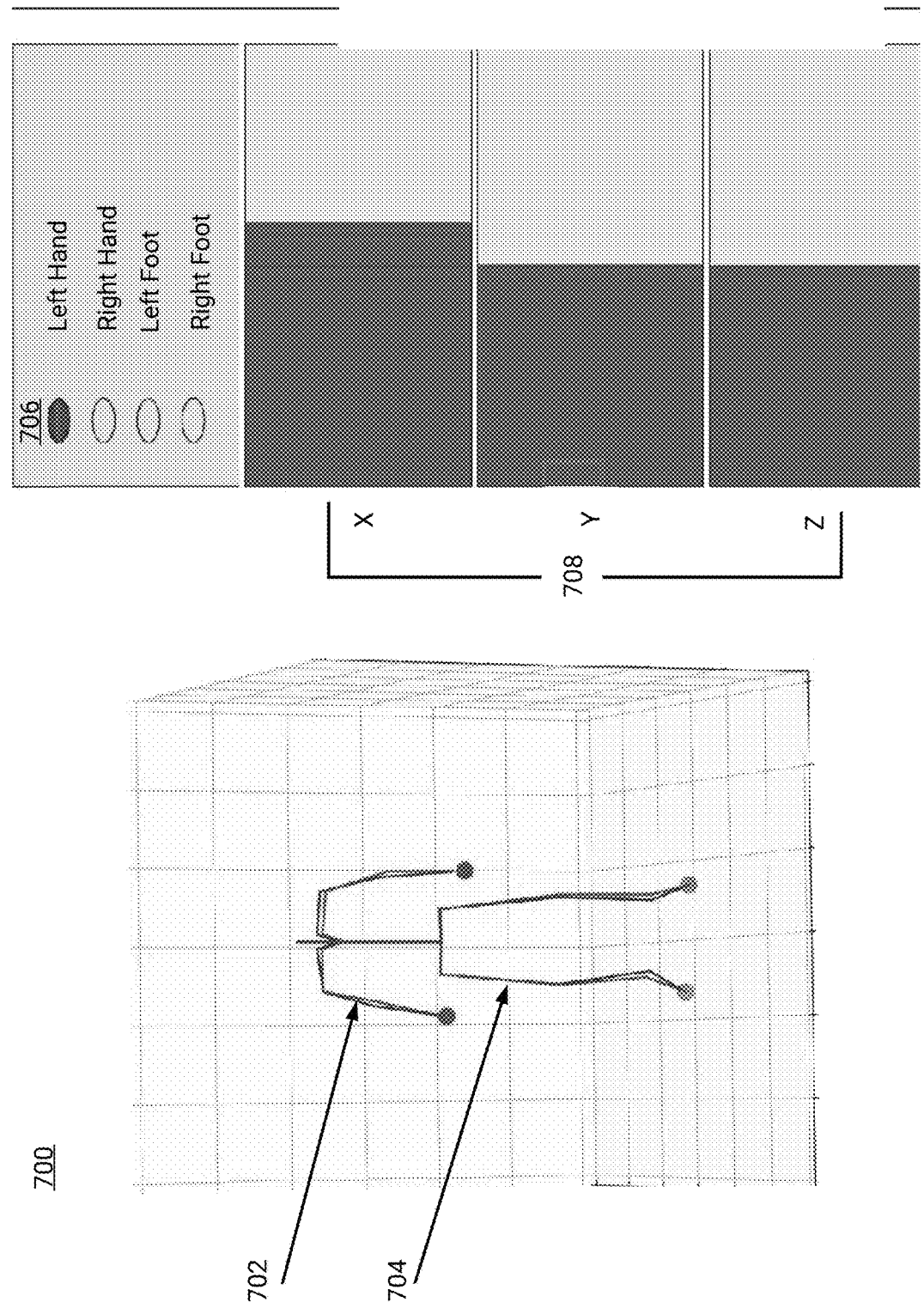
FIGS. 7A-7C illustrate example user interfaces for implementing inverse kinematics.
Figure 7B:
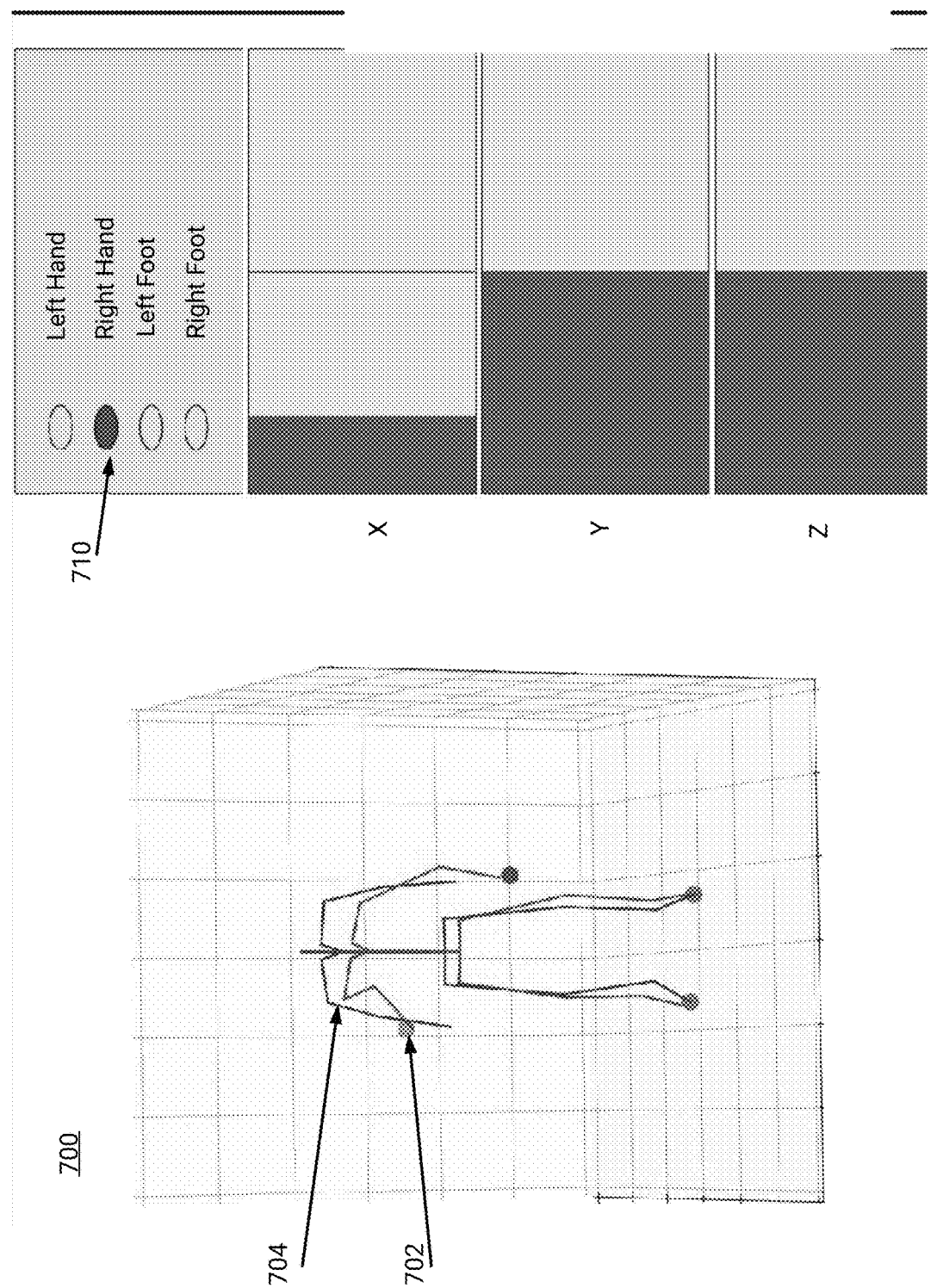
Figure 7C:
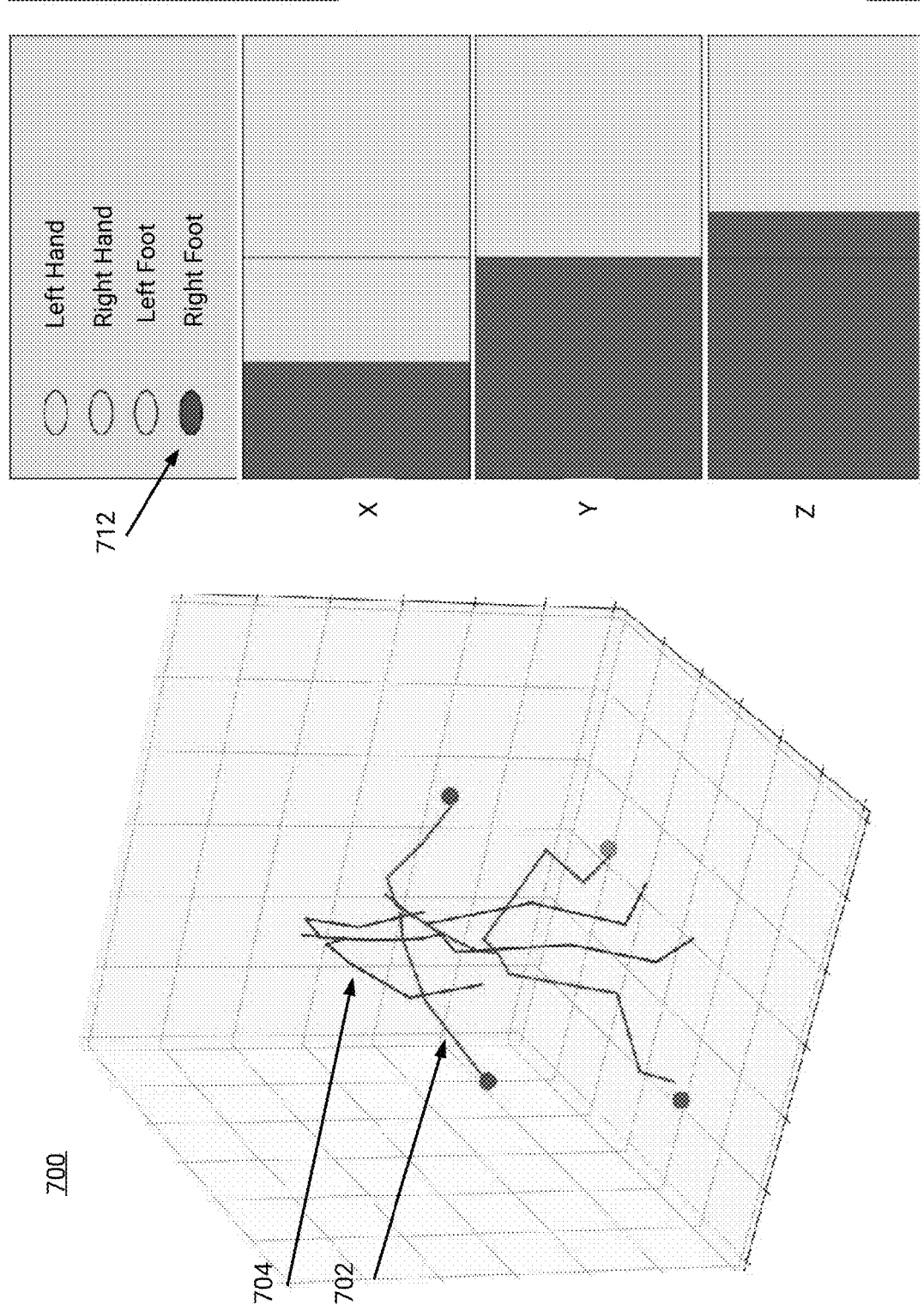

At block 504, the system obtains conditional information. A user of the system may provide conditional information, for example via a user interface. An example user interface is illustrated in FIGS. 7A-7C, with the user interface being usable to receive position information for certain joints (e.g., hands and feet). With respect to the conditional information being prior poses, the user may provide one or more poses in a sequence of poses.

At block 506, the system samples a latent feature space. As described above, the conditional variational autoencoder may be trained via concatenating conditional information to input information provided to the encoder and the decoder. In some embodiments, the system may perform random sampling of the latent variables. For example, the system may assign values to each latent variable based on random sampling around Gaussian distributions associated with the latent variables. These Gaussian distributions may, in some embodiments, have a mean of zero and a standard deviation of one.

At block 508, the system generates an output pose. The above-described samples may be provided to the decoder. Given the samples and the conditional information, the decoder may then generate an output pose. In some embodiments, and as described above, the samples of latent variables may be random Gaussian samples. In some embodiments, the samples may be informed based on a goal or action desired by a user. For example, a classifier or controller may be trained to determine samples which comport with the goal or action.

While the description above focused on obtaining conditional information and generating an output pose, in some embodiments an input pose may be additionally be obtained. For example, the encoder may map the input pose to a portion of the latent feature space. The conditional information may then be used to sample from the portion. In this way, the conditional information may enable modification of the input pose.

In some embodiments, additional conditional information may be used during training of the conditional variational autoencoder. As an example, direction of movement or labels associated with a goal or action indicative of the movement may be used. For example, a label indicative of punching may be used. As another example, multiple labels indicative of particular discrete portions of a punch may be used. At runtime, for example with respect to process 500, this additional information may be provided by a user. In this way, the user may guide the decoder to outputting a pose which corresponds with the label or with a direction of movement.

Figure 6A:
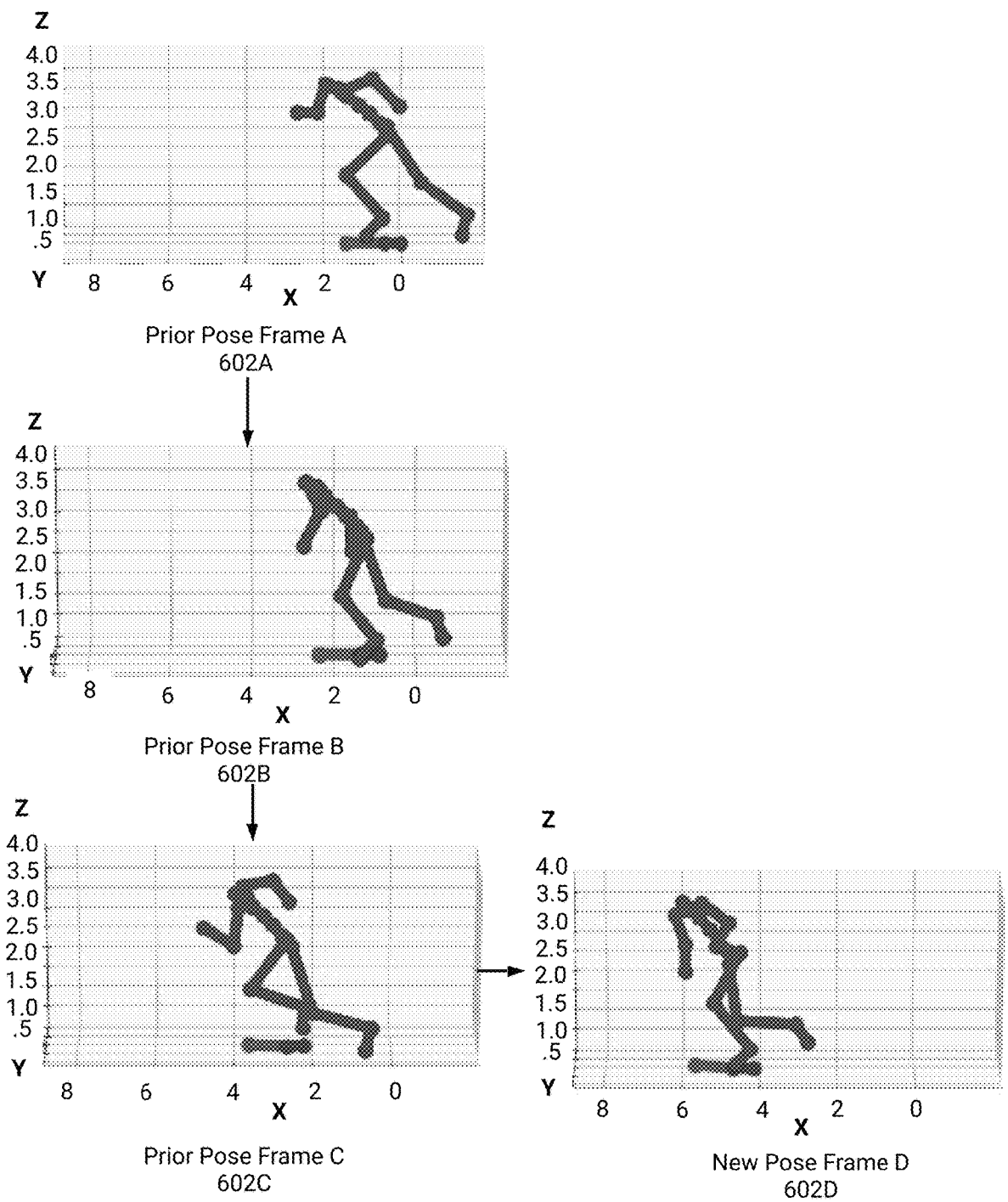
FIG. 6A illustrates an example of generating a new pose based on a sequence of poses.

FIG. 6A illustrates an example animation of movement generated based on a sequence of poses 602A-602C. While three poses are included in the sequence, in some embodiments one pose, two poses, or four or more poses may be used. In some embodiments, the conditional variational autoencoder described above may be conditioned using frames of animation. As an example, a first pose may be provided as an input when training the conditional variational autoencoder. This first pose may represent a pose depicted in a frame of animation and may be conditioned based on one or more prior frames of the animation. For example, the first pose may represent a next frame of animation subsequent to the prior frames. The conditional variational autoencoder may be trained to reconstruct the first pose using the prior frames as conditional information. As described above, the conditional variational autoencoder may be used to generate a new frame of animation given a short-term history of the animation up until a current frame. Thus, the conditional variational autoencoder may generate animations from only a set of starting poses 602A-602C.

As described above, the sequence of poses 602A-602C are provided to the pose representation system 100, which may use the trained conditional variational autoencoder to generate output pose 602D. For example, an interactive user interface may be presented to a user. The user may then select a sequence of poses 602A-602C. In some embodiments, the sequence of poses 602A-602C may be associated with an in-game character of an electronic game running on a user device. As described above, an output pose 602D may be generated and used to adjust a skeleton of the in-game character.

The example output pose 602D depicted in FIG. 6A may be understood to represent a subset of the output poses which the system 100 may generate based on poses 420A-420B. For example, the system 100 may generate a threshold number of poses 422C-422E based on sampling the latent feature space. In this example, the system 100 may assign random values to latent variables via sampling Gaussian distributions associated with the latent variables. In some embodiments, a controller or classifier may be used to select from among the threshold number of generated poses. For example, a particular goal or action may be preferred for the output pose 602D. The controller or classifier may be trained to select from among these threshold number of poses to identify a pose which corresponds with the goal or action.

Figure 6B:
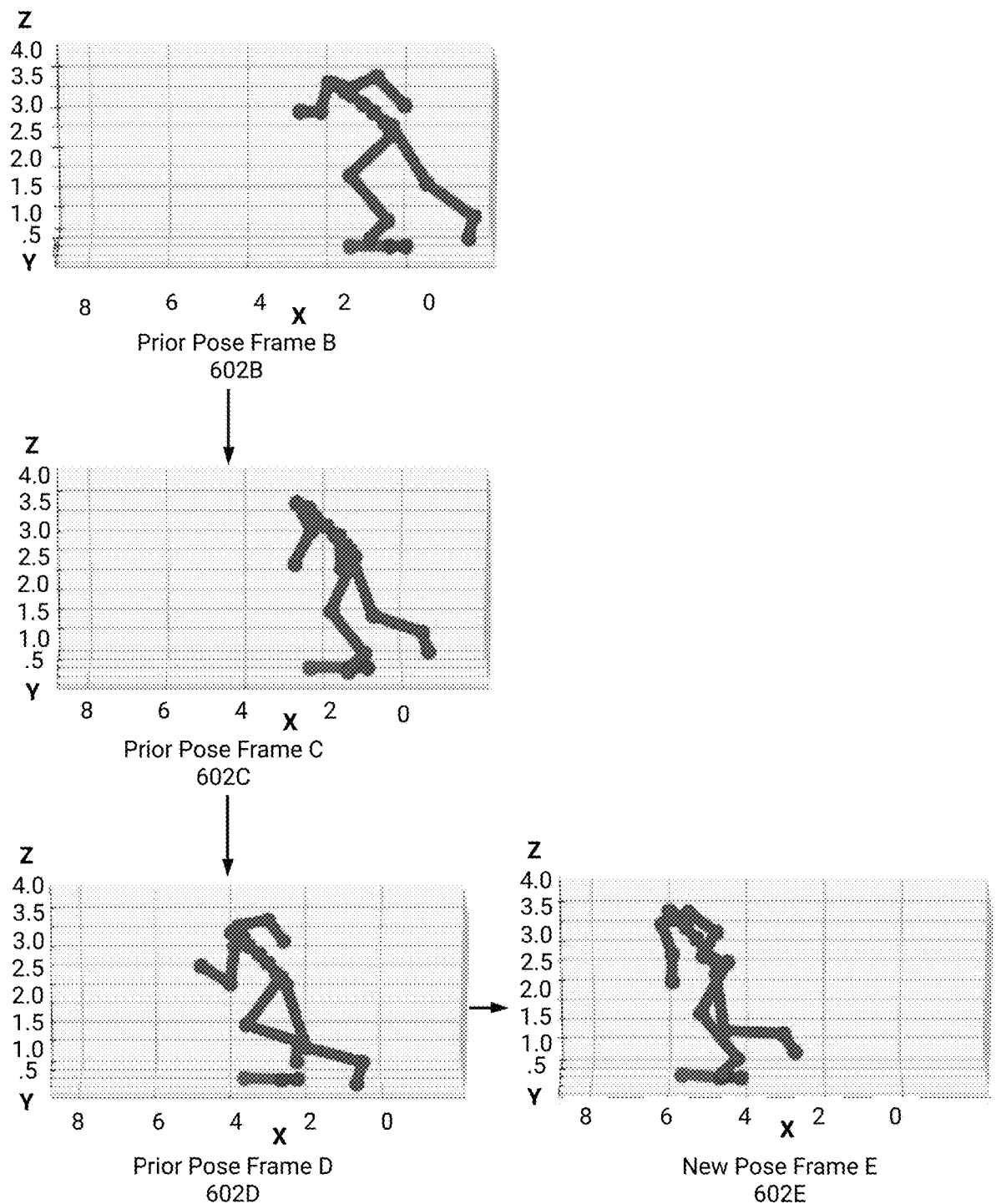
FIG. 6B illustrates another example of generating a new pose based on an updated sequence of poses.

FIG. 6B illustrates another example of generating a new pose based on an updated sequence of poses. In this example, pose 602A is discarded and output pose 602D is included in the sequence of poses 602B-602D. Thus, a new sequence of poses 602B-602D has been generated. Similar to the above, this sequence may be used to generate new pose 602E. This process may be repeated until a threshold number of poses has been generated. In some embodiments, the threshold number of poses may be blended together by the system 100 to generate an animation.

In some embodiments, the pose representation system 100 may generate an animation based on the sequence of poses and output poses. For example, the animation may include poses 602A-602E. The system 100 may optionally blend the poses together to generate the animation. The system 100 may additionally generate the animation via adjusting positions of joints, end-effectors, and so on, of a skeleton based on the poses 602A-602E. This animation may be provided for presentation to a user via an interactive user interface. The animation may also be used in an electronic game (e.g., an in-game character may be rendered to follow the poses 602A-602E).

While a conditional variational autoencoder is described herein, in some embodiments a long short-term memory (LSTM) autoencoder may be used. As may be appreciated, an LSTM autoencoder may learn sequences of input data. For example, a given sequence of input data may represent an animation depicting poses. In this example, the LSTM autoencoder may obtain the input data, encode the data, decode the data and thus attempt to recreate the sequence. In this way, one or more initial poses may be provided to the LSTM autoencoder which may attempt to generate output poses forming a realistic animation.

Additionally, while the autoencoders herein are described as being formed from dense (e.g., fully-connected) layers, in some embodiments convolutional layers may be used. For example, an encoder and decoder of an autoencoder may be formed from convolutional layers comprising volumes of filters. These may be used, as an example, with respect to generating animation and/or motion. For example, generating a frame of animation may be conditioned on a threshold number of prior frames. Inputs to this model may include multiple feature vectors for the frames, which may be concatenated along a time dimension. The convolutional neural network may thus learn time-dependent features and may allow for a smaller number of parameters as compared to dense networks.

FIGS. 7A-7C illustrate example user interfaces 700 for implementing inverse kinematics. In some embodiments, the conditional variational autoencoder described above may be conditioned using inverse kinematics information. For example, each pose may be conditioned on the positions of the different joints. In this example, the positions may thus be provided as labels for the poses. Based on this conditional information, the conditional variational autoencoder may learn meanings associated with the positions.

With reference to FIG. 7A, an example user interface 700 is illustrated. The user interface 700 may represent a user interface generated by an application executing on a user device (e.g., a mobile application). The user interface 700 may also be generated by the pose representation system 100. In some embodiments, the user interface 700 may represent a front-end of a web application associated with the pose representation system 100. In this way, users may access the pose representation system 100 via a network (e.g., the internet).

In the user interface 700, an output pose 702 is illustrated. The output pose 702 may be generated based on adjustment of options 706. Examples of adjustment of output poses are illustrated in FIGS. 7B-7C with respect to options 710-712. As described above, the pose representation system 100 may, in some embodiments, train a conditional variational autoencoder. This autoencoder may be conditioned on position information associated with the joints. A user may therefore adjust options 706 to define position information. This position information may then be used by the decoder, along with samples of the latent feature space as described above, to generate an output pose. Thus, the system 100 may allow for realistic generation of output poses based on selection of position information via options 706.

In some embodiments, the user interface 700 may present a neutral pose 704. For example, FIG. 7A illustrates neutral pose 704 which may provide a neutral reference position for ease of reference by the user. The neutral pose 704 may represent a known orientation of the options 706. In this way, as a user of user interface 700 adjusts options 706, the user may view the resulting difference from the neutral pose 704

In contrast to prior techniques, each adjustment of a joint via options 706 may cause the system 100 to provide the adjustment to the autoencoder. For example, the system 100 may sample the latent feature space and generate a pose based on the decoder using the adjustments as conditional information. In this way, the resulting pose may not merely have its arm placed backwards but may realistically have its arm moved backwards in accordance with the learned latent feature space.

In the illustrated example, the user interface 700 allows for adjustment of specific portions of the skeleton via options 706. For example, the options enable adjustments of a left hand, a right hand, a left foot, and a right food. These options 706 may correspond to features on which the autoencoder is conditioned. For example, the left hand may indicate positions of one or more joints associated with the left hand. Similarly, the left foot may indicate positions of one or more joints associated with the left foot (e.g., an ankle, a knee, a left portion of the hip, and so on).

The user interface 700 further allows for a user to select an option (e.g., the left hand is selected). The user may then adjust user interface elements 708, such as sliders, associated with positions of the portion. Thus, the user may adjust an X, Y, and/or Z, coordinate to move the portion about. As described above, adjustment of the user interface elements may cause the system 100 to generate a realistic pose based on the conditional variational autoencoder described above.

With reference to FIG. 7B, the user has adjusted positions of the right hand 710. In response, the user interface 700 has updated to represent movement of the right hand.

With reference to FIG. 7C, the user has adjusted additional positions. Additionally, the user has rotated a viewpoint associated with output pose 702. In some embodiments, the representation of the output pose 702 may be rotated in three-hundred sixty degrees. As illustrated, the user has adjusted a right foot 712 backwards, causing the output pose 702 to update accordingly. Advantageously, other portions of the output pose 702 may be updated. Since the output pose 702 is generated based on the conditional variational autoencoder described above, the adjustment of the right foot 712 may lead to other realistic adjustments. For example, shoulders may slump downwards, and so on.

Example Computing System

Figure 8:
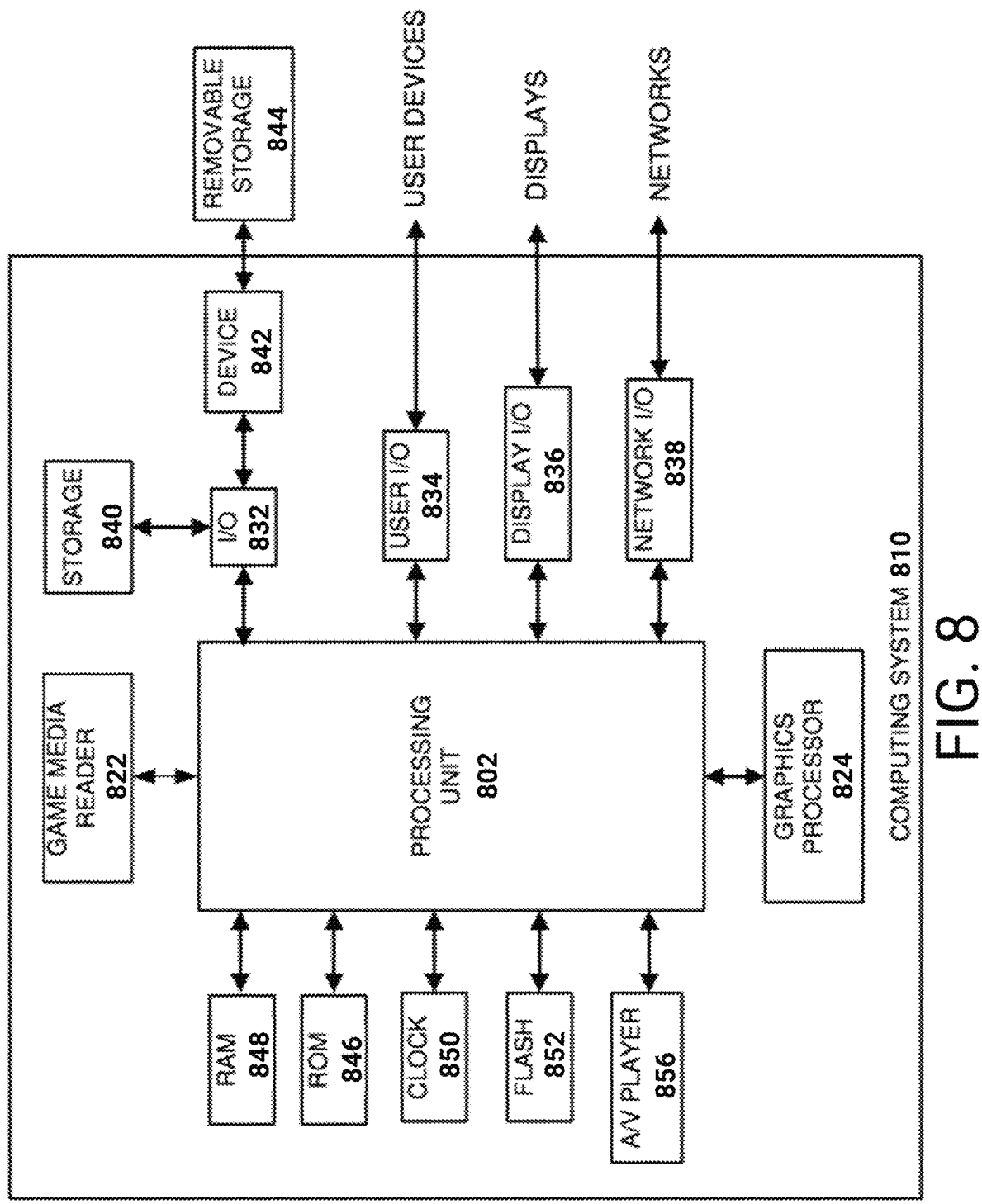
FIG. 8 illustrates an embodiment of computing device according to the present disclosure.

FIG. 8 illustrates an embodiment of computing device 810 according to the present disclosure. Other variations of the computing device 810 may be substituted for the examples explicitly presented herein, such as removing or adding components to the computing device 810. The computing device 810 may include a game device, a smart phone, a tablet, a personal computer, a laptop, a smart television, a car console display, a server, and the like. The computing device 810 may also be distributed across multiple geographical locations. For example, the computing device 810 may be a cluster of cloud-based servers.

As shown, the computing device 810 includes a processing unit 820 that interacts with other components of the computing device 810 and also external components to computing device 810. A game media reader 822 is included that communicates with game media 812. The game media reader 822 may be an optical disc reader capable of reading optical discs, such as CD-ROMs or DVDs, or any other type of reader that can receive and read data from game media 812. One or more of the computing devices may be used to implement one or more of the systems disclosed herein.

Computing device 810 may include a separate graphics processor 824. In some cases, the graphics processor 824 may be built into the processing unit 820. In some such cases, the graphics processor 824 may share Random Access Memory (RAM) with the processing unit 820. Alternatively, or additionally, the computing device 810 may include a discrete graphics processor 824 that is separate from the processing unit 820. In some such cases, the graphics processor 824 may have separate RAM from the processing unit 820. Computing device 810 might be a handheld game application device, a dedicated game console computing system, a general-purpose laptop or desktop computer, a smart phone, a tablet, a car console, or other suitable system.

Computing device 810 also includes various components for enabling input/output, such as an I/O 832, a user I/O 834, a display I/O 836, and a network I/O 838. I/O 832 interacts with storage element 840 and, through a device 842, removable storage media 844 in order to provide storage for computing device 810. Processing unit 820 can communicate through I/O 832 to store data, such as game state data and any shared data files. In addition to storage 840 and removable storage media 844, computing device 810 is also shown including ROM (Read-Only Memory) 846 and RAM 848. RAM 848 may be used for data that is accessed frequently, such as when a video game is being played.

User I/O 834 is used to send and receive commands between processing unit 820 and user devices, such as game controllers. In some embodiments, the user I/O 834 can include a touchscreen input. The touchscreen can be capacitive touchscreen, a resistive touchscreen, or other type of touchscreen technology that is configured to receive user input through tactile inputs from the player. Display I/O 836 provides input/output functions that are used to display images from the game being played. Network I/O 838 is used for input/output functions for a network. Network I/O 838 may be used during execution of a game, such as when a game is being played online or being accessed online, application of fraud detection, and/or generation of a fraud detection model.

Display output signals produced by display I/O 836 comprise signals for displaying visual content produced by computing device 810 on a display device, such as graphics, user interfaces, video, and/or other visual content. Computing device 810 may comprise one or more integrated displays configured to receive display output signals produced by display I/O 836. According to some embodiments, display output signals produced by display I/O 836 may also be output to one or more display devices external to computing device 810.

The computing device 810 can also include other features that may be used with a video game, such as a clock 850, flash memory 582, and other components. An audio/video player 856 might also be used to play a video sequence, such as a movie. It should be understood that other components may be provided in computing device 810 and that a person skilled in the art will appreciate other variations of computing device 810.

Program code can be stored in ROM 846, RAM 848 or storage 840 (which might comprise a hard disk, other magnetic storage, optical storage, other non-volatile storage or a combination or variation of these). Part of the program code can be stored in ROM that is programmable (ROM, PROM, EPROM, EEPROM, and so forth), and part of the program code can be stored in storage 840, and/or on removable media such as game media 812 (which can be a CD-ROM, cartridge, memory chip or the like, or obtained over a network or other electronic channel as needed). In general, program code can be found embodied in a tangible non-transitory signal-bearing medium.

Random access memory (RAM) 848 (and possibly other storage) is usable to store variables and other game and processor data as needed. RAM 848 is used and holds data that is generated during the execution of an application and portions thereof might also be reserved for frame buffers, application state information, and/or other data needed or usable for interpreting user input and generating display outputs. Generally, RAM 848 is volatile storage and data stored within RAM 848 may be lost when the computing device 810 is turned off or loses power.

As computing device 810 reads game media 812 and provides an application, information may be read from game media 812 and stored in a memory device, such as RAM 848. Additionally, data from storage 840, ROM 846, servers accessed via a network (not shown), or removable storage media 844 may be read and loaded into RAM 848. Although data is described as being found in RAM 848, it will be understood that data does not have to be stored in RAM 848 and may be stored in other memory accessible to processing unit 820 or distributed among several media, such as game media 812 and storage 840.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

Additional Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:
    accessing an autoencoder trained based on a plurality of poses of one or more real-world persons and conditional information associated with the poses, wherein the conditional information for each pose reflects one or more prior poses of the pose;
    obtaining a sequence of poses comprising a first pose and a second pose which is subsequent to the first pose; and
    generating, based on the autoencoder for inclusion in an interactive user interface, an output pose based on the sequence of poses, wherein the sequence of poses is updated to include the output pose.

2. The method of claim 1, wherein the sequence of poses is provided via the interactive user interface.

3. The method of claim 1, wherein the updated sequence of poses is blended to form an animation.

4. The method of claim 1, wherein the sequence of poses is obtained from an animation of a character or from video of a real-world person.

5. The method of claim 1, wherein the conditional information further includes position information associated with a skeleton.

6. The method of claim 1, wherein the first pose is discarded from the updated sequence of poses.

7. The method of claim 1, wherein the autoencoder was trained to reconstruct, via a latent variable space, each pose based on the conditional information.

8. The method of claim 7, further comprising:
sampling the latent variable space; and
generating a second output pose based on the sampling and the updated sequence of poses.

9. The method of claim 7, wherein the latent variable space is associated with a plurality of latent variables, the latent variables reflecting Gaussian distributions, and wherein sampling the latent variable space comprises:
generating random Gaussian samples for respective values of the latent variables.

10. The method of claim 1, wherein each pose is further defined based on velocity information associated with joints.

11. Non-transitory computer storage media storing instructions that when executed by a system of one or more computers, cause the one or more computers to perform operations comprising:
accessing an autoencoder trained based on a plurality of poses of one or more real-world persons and conditional information associated with the poses, wherein the conditional information for each pose reflects one or more prior poses of the pose;
obtaining a sequence of poses comprising a first pose and a second pose which is subsequent to the first pose; and
generating, based on the autoencoder for inclusion in an interactive user interface, an output pose based on the sequence of poses, wherein the sequence of poses is updated to include the output pose.

12. The computer storage media of claim 11, wherein the sequence of poses is provided via the interactive user interface.

13. The computer storage media of claim 11, wherein the updated sequence of poses is blended to form an animation which is configured for inclusion in the interactive user interface.

14. The computer storage media of claim 11, wherein the conditional information further includes position information associated with a skeleton.

15. The computer storage media of claim 11, wherein the autoencoder was trained to reconstruct, via a latent variable space, each pose based on the conditional information.

16. The computer storage media of claim 15, wherein the operations further comprise:
sampling the latent variable space; and
generating a second output pose based on the sampling and the updated sequence of poses.

17. The computer storage media of claim 11, wherein each pose is further defined based on velocity information associated with joints.

18. A system comprising one or more computers and non-transitory computer storage media storing instructions that when executed by the one or more computers, cause the one or more computers to perform operations comprising:
accessing an autoencoder trained based on a plurality of poses of one or more real-world persons and conditional information associated with the poses, wherein the conditional information for each pose reflects one or more prior poses of the pose;
obtaining a sequence of poses comprising a first pose and a second pose which is subsequent to the first pose; and
generating, based on the autoencoder for inclusion in an interactive user interface, an output pose based on the sequence of poses, wherein the sequence of poses is updated to include the output pose.

19. The system of claim 18, wherein the updated sequence of poses is blended to form an animation which is configured for inclusion in the interactive user interface.

20. The system of claim 18, wherein each pose is further defined based on velocity information associated with joints.

* * * * *